United States Patent
Kim et al.

(10) Patent No.: US 12,057,620 B2
(45) Date of Patent: Aug. 6, 2024

(54) ELECTRONIC DEVICE AND METHOD FOR INCREASING ANTENNA EFFICIENCY OF ELECTRONIC DEVICE

(71) Applicant: Samsung Electronics Co., Ltd., Suwon-si (KR)

(72) Inventors: Bohyeon Kim, Suwon-si (KR); Myunghoon Kwak, Suwon-si (KR); Baekeun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 17/452,351

(22) Filed: Oct. 26, 2021

(65) Prior Publication Data
US 2022/0115769 A1 Apr. 14, 2022

Related U.S. Application Data

(63) Continuation of application No. PCT/KR2021/014029, filed on Oct. 12, 2021.

(30) Foreign Application Priority Data

Oct. 12, 2020 (KR) .................. 10-2020-0131217
Dec. 28, 2020 (KR) .................. 10-2020-0184390

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1624* (2013.01); *G06F 1/1652* (2013.01);
(Continued)

(58) Field of Classification Search
CPC ................................ H01Q 1/243; H02J 50/12
(Continued)

(56) References Cited

U.S. PATENT DOCUMENTS 9,130,397 B2 * 9/2015 Leabman ................ H02J 50/23
11,081,795 B2 8/2021 Lee et al.
(Continued)

FOREIGN PATENT DOCUMENTS

JP 2011-165151 A 8/2011
JP 2012129975 A 7/2012
(Continued)

OTHER PUBLICATIONS

International Search Report and Written Opinion of the International Searching Authority, issued Jan. 24, 2022, in connection with International Patent Application No. PCT/KR2021/014029, 14 pages.
(Continued)

*Primary Examiner* — Yalkew Fantu

(57) ABSTRACT

Various embodiments of the disclosure relate to an electronic device and a method for increasing efficiency of an antenna. The method may include performing a short-range communication function using a first coil in a closed state in which at least a portion of a first housing of the electronic device is slid into an inner space of a second housing of the electronic device, and performing the short-range communication function using a second coil in an open state in which at least a portion of the first housing is slid out of the inner space of the second housing. The disclosure provides various other embodiments.

15 Claims, 15 Drawing Sheets

(51) Int. Cl.
*H02J 50/00* (2016.01)
*H02J 50/12* (2016.01)
*H04B 5/79* (2024.01)

(52) U.S. Cl.
CPC ............ *H02J 50/005* (2020.01); *H02J 50/12* (2016.02); *H04B 5/79* (2024.01)

(58) Field of Classification Search
USPC ........................................................ 320/138
See application file for complete search history.

(56) References Cited

U.S. PATENT DOCUMENTS

| | | | |
|---|---|---|---|
| 2009/0066585 A1 | 3/2009 | Sato et al. | |
| 2011/0273346 A1 | 11/2011 | Nekozuka | |
| 2013/0005252 A1* | 1/2013 | Lee | H02J 50/12 307/18 |
| 2013/0106666 A1 | 5/2013 | Shan et al. | |
| 2013/0214978 A1 | 8/2013 | Tsai et al. | |
| 2014/0111153 A1* | 4/2014 | Kwon | H02J 50/40 320/108 |
| 2015/0180284 A1* | 6/2015 | Kang | H04W 4/80 307/104 |
| 2016/0141884 A1 | 5/2016 | Lee et al. | |
| 2016/0181857 A1 | 6/2016 | Konanur et al. | |
| 2019/0312451 A1 | 10/2019 | An et al. | |
| 2019/0371515 A1 | 12/2019 | Ha et al. | |
| 2020/0251928 A1 | 8/2020 | Ha et al. | |
| 2021/0135492 A1 | 5/2021 | Kim et al. | |

FOREIGN PATENT DOCUMENTS

| | | |
|---|---|---|
| KR | 20160018724 A | 2/2016 |
| KR | 10-2017-0018646 A | 2/2017 |
| KR | 20190019692 A | 2/2019 |
| KR | 10-2019-0115888 A | 10/2019 |
| KR | 20190118058 A | 10/2019 |
| KR | 20190138536 A | 12/2019 |
| KR | 102086345 B1 | 3/2020 |
| KR | 20200046313 A | 5/2020 |
| WO | 2019194520 A1 | 10/2019 |

OTHER PUBLICATIONS

Supplementary European Search Report dated Oct. 24, 2023, in connection with European Patent Application No. 21880471.4, 11 pages.

Examination Report issued Feb. 1, 2024, in connection with Indian Patent Application No. 202337013167, 6 pages.

* cited by examiner

∴ K1 = K2

∴ K3 < K4

ELECTRONIC DEVICE AND METHOD FOR INCREASING ANTENNA EFFICIENCY OF ELECTRONIC DEVICE

CROSS-REFERENCE TO RELATED APPLICATIONS

This application is a continuation of International Application No. PCT/KR2021/014029, filed Oct. 12, 2021, which claims priority to Korean Patent Application No. 10-2020-0131217, filed Oct. 12, 2020, and Korean Patent Application No. 10-2020-0184390, filed Dec. 28, 2020, the disclosures of which are herein incorporated by reference in their entirety.

BACKGROUND

1. Field

Various embodiments of the disclosure relate to an electronic device including a flexible display and a method, and to an electronic device and a method capable of increasing antenna efficiency.

2. Description of Related Art

As display technology develops, research and development on an electronic device having a flexible display is being actively conducted. The flexible display can be folded, bent, rolled, or unfolded. An electronic device including a flexible display can change the size of a screen visible to a user.

The electronic device may include at least one antenna for wireless communication with an external electronic device or for charging a battery. For example, the electronic device may perform near field communication (NFC), magnetic secure transmission (MST), or wireless charging using at least one antenna.

SUMMARY

Research and development is actively conducted on a slidable electronic device in which the display area of a display is variable by applying a flexible display to an electronic device. In the electronic device, a portion of the flexible display may move in a slide-in or slide-out manner in conjunction with sliding movement of a partial housing of the electronic device.

The electronic device may have at least one coil provided therein as an antenna for short-range communication functions (e.g., a wireless charging function, magnetic secure transmission (MST) communication, and/or near field communication (NFC)).

As the form of the electronic device is changed, the center of a coil being used for short-range communication may become located at a position that is not close to the center of the electronic device, thereby reducing the efficiency of the antenna. For example, although the center of the coil and the center of the electronic device may be arranged close to each other in a closed state of the electronic device in which a portion of the flexible display is in a slide-in state, the center of the coil and the center of the electronic device are spaced apart from each other in an open state of the electronic device in which a portion of the flexible display is in a slide-out state, so the center of the coil does not align with the center of a coil of an antenna included in an external electronic device, thereby lowering the efficiency of the antenna.

Various embodiments of the disclosure may provide an electronic device capable of reducing a decrease in efficiency of an antenna for short-range communication even if the form of the electronic device is changed.

The technical problems to be solved in the disclosure are not limited to the technical problems mentioned above, and other technical problems that are not mentioned can be clearly understood by those of ordinary skill in the art to which the disclosure pertains from the description below.

An electronic device according to various embodiments of the disclosure may include a housing comprising a first housing and a second housing and configured such that the first housing is able to slide in a first direction with respect to the second housing, a short-range communication module located inside the housing, a circuit board located inside the housing, the circuit board including a first coil and a second coil that are configured to be selectively connected to the short-range communication module, and a processor located inside the housing. The processor may be configured to activate a short-range communication function using the short-range communication module, perform the short-range communication function using the first coil in a closed state in which at least a portion of the first housing slides into the inner space of the second housing, and perform the short-range communication function using the second coil in an open state in which at least a portion of the first housing slides out of the inner space of the second housing. The center of the first coil may be disposed to be aligned with a first central axis that crosses the center of the electronic device in the closed state, and the center of the second coil may be disposed to be aligned with a second central axis that crosses the center of the electronic device in the open state.

A method of an electronic device according to various embodiments of the disclosure may include performing a short-range communication function using a first coil in a closed state in which at least a portion of a first housing of the electronic device is slid into an inner space of a second housing of the electronic device, and performing the short-range communication function using a second coil in an open state in which at least a portion of the first housing is slid out of the inner space of the second housing.

An electronic device according to various embodiments of the disclosure can reduce a decrease in the efficiency of an antenna for short-range communication even if the form of the electronic device is changed (e.g., from open to closed or vice versa), thereby stably performing short-range communication functions regardless of the form of the electronic device.

In addition to this, various effects that are directly or indirectly identified may be provided through the disclosure.

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The above and other aspects, features and advantages of certain embodiments of the disclosure will be more apparent from the following detailed description, taken in conjunction with the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
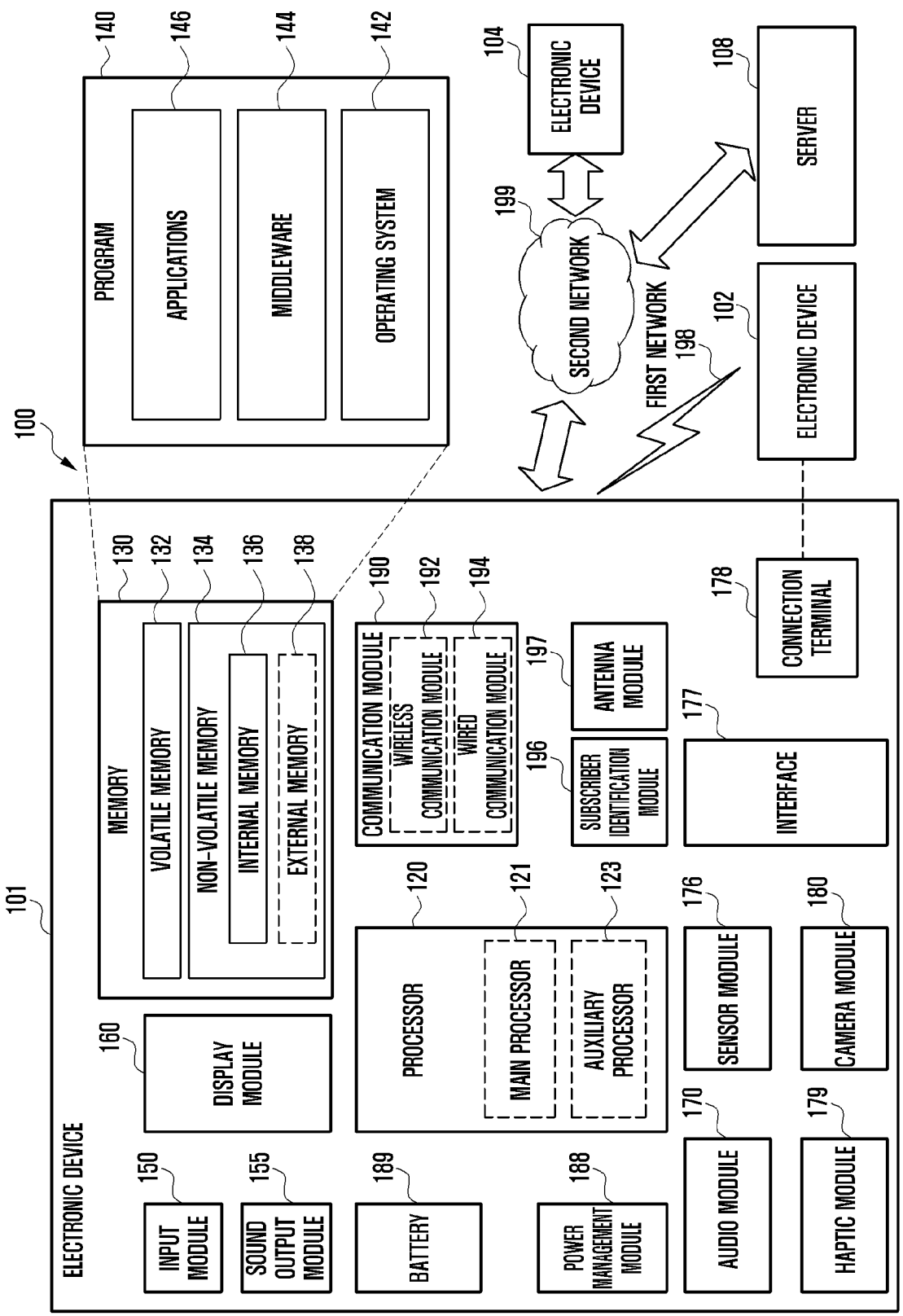
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
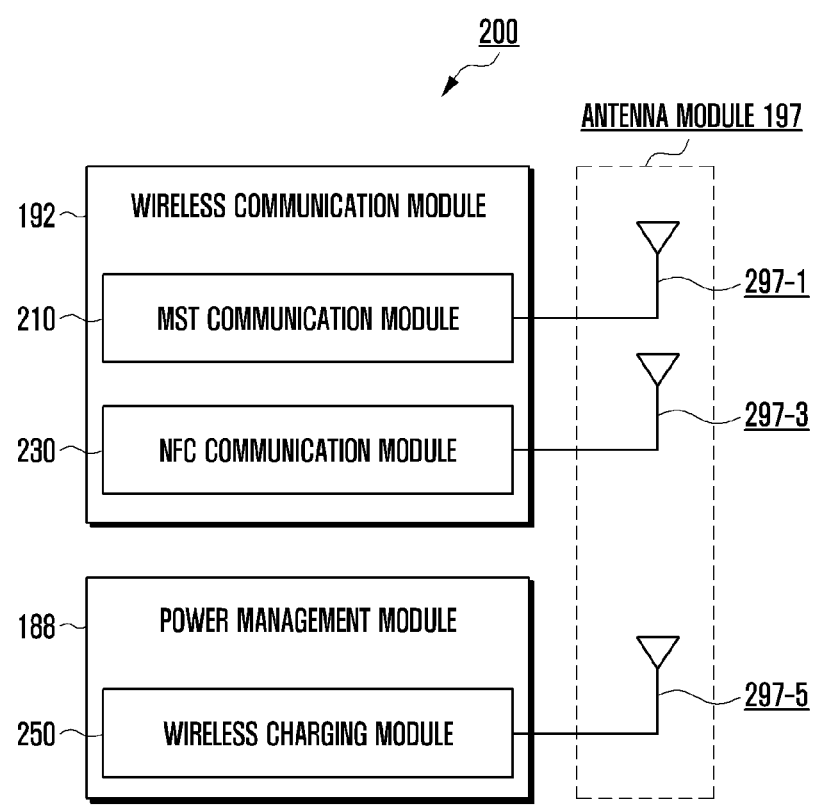
FIG. 2 is a block diagram illustrating a wireless communication module, a power management module, and an antenna module of an electronic device according to various embodiments.

FIG. 2 is a block diagram 200 illustrating the wireless communication module 192, the power management module 188, and the antenna module 197 of the electronic device 101 according to various embodiments. Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102.

According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

According to various embodiments, at least some of the antennas 297-1, 297-3, or 297-5 may include a first coil (e.g., the first coil 711 in FIG. 9A) and a second coil (e.g., the second coil 712 in FIG. 9B) having different forms from each other. According to various embodiments, the wireless communication module 192 and/or the power management module 188 may include a switching circuit (not shown) configured to selectively connect (e.g., close) or disconnect (e.g., open) at least a portion of the first coil 711 or the second coil 712, based on the control of the processor (e.g., the processor 120 in FIG. 1). For example, the processor 120 may perform control to selectively connect (e.g., close) or disconnect (e.g., open) at least a portion of the first coil 711 or the second coil 712 depending on whether the electronic device is in an open state or a closed state. According to an embodiment, the switching circuit for selectively connecting or disconnecting the first coil 711 or the second coil 712 may be included in the wireless communication module 192 and/or the power management module 188. As another example, the switching circuit for selectively connecting or disconnecting the first coil 711 or the second coil 712 may be positioned on the electrical path that electrically connects the wireless communication module 192 and/or the power management module 188 to the first coil 711 or the second coil 712.

Figure 3:
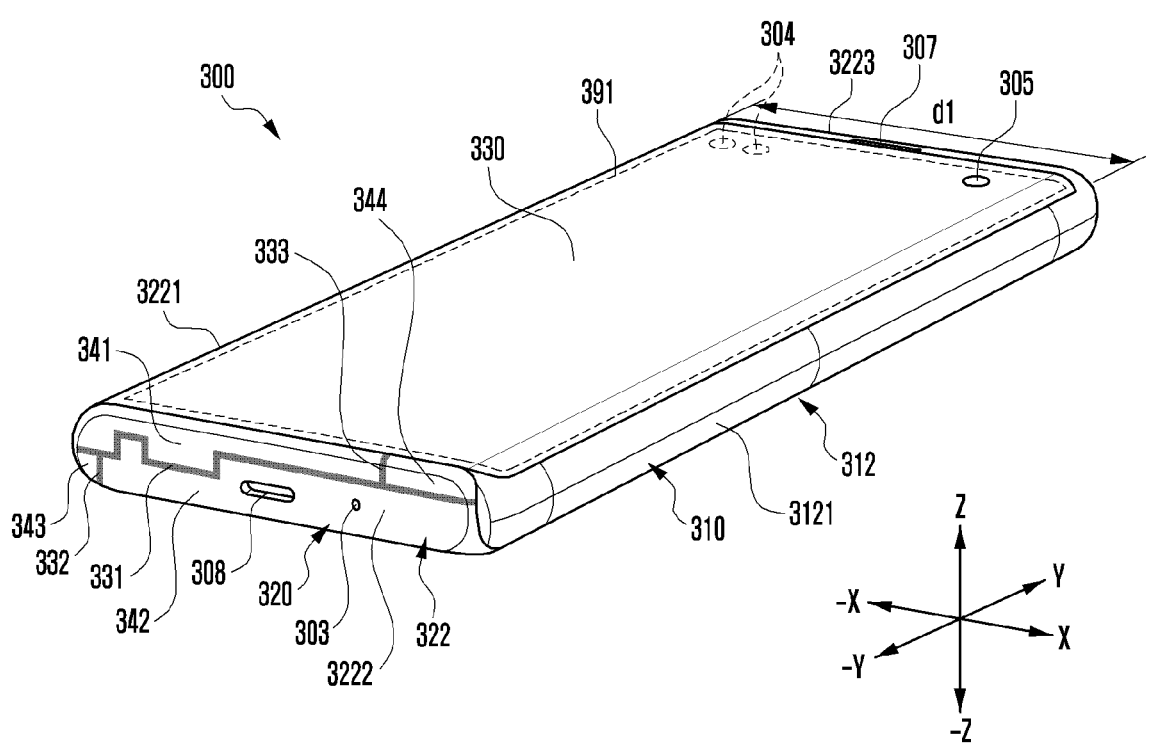
FIG. 3 is a front perspective view of an electronic device showing a closed state according to various embodiments of the disclosure.
Figure 4:
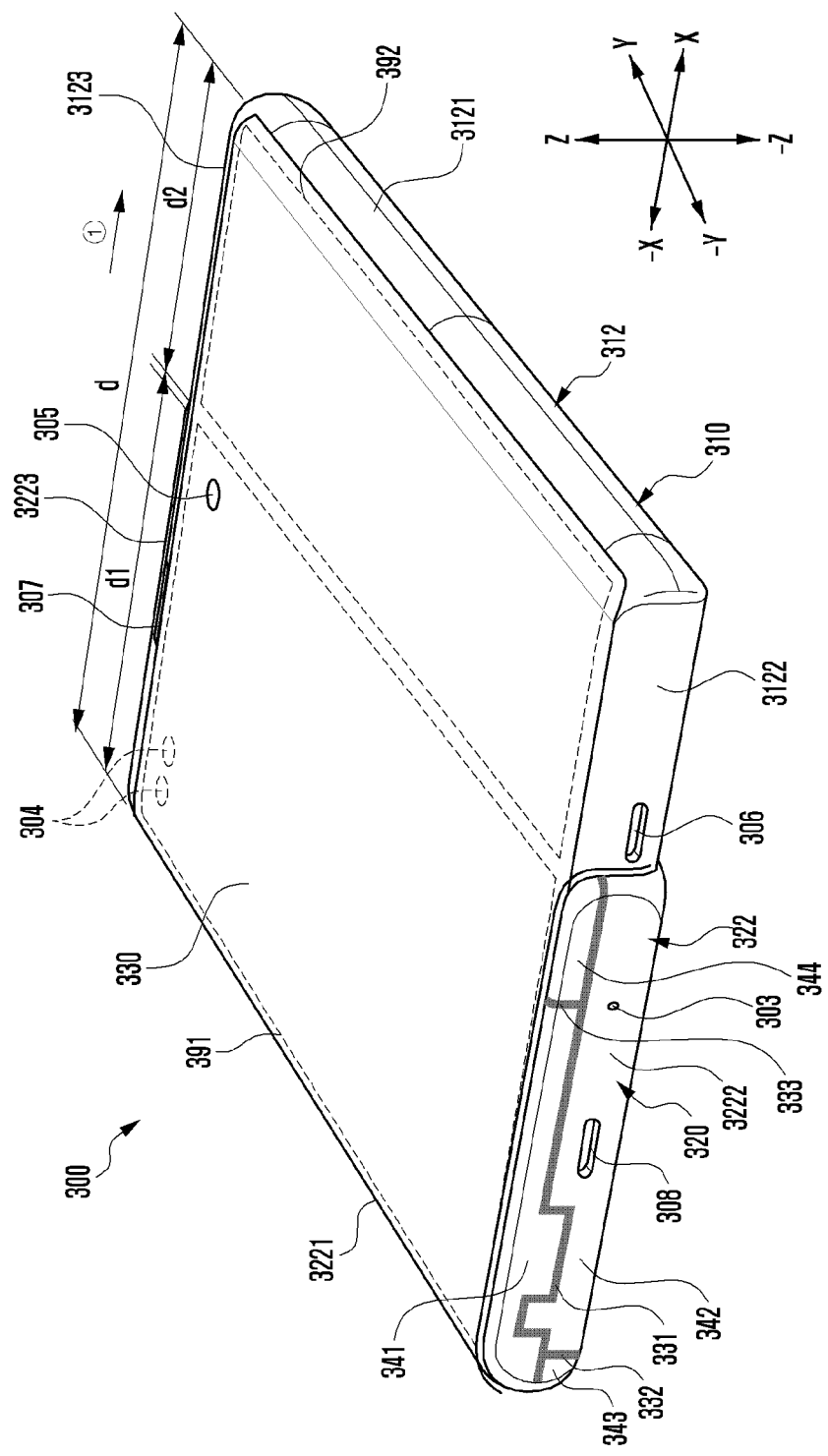
FIG. 4 is a front perspective view of an electronic device showing an open state according to various embodiments of the disclosure.
Figure 5:
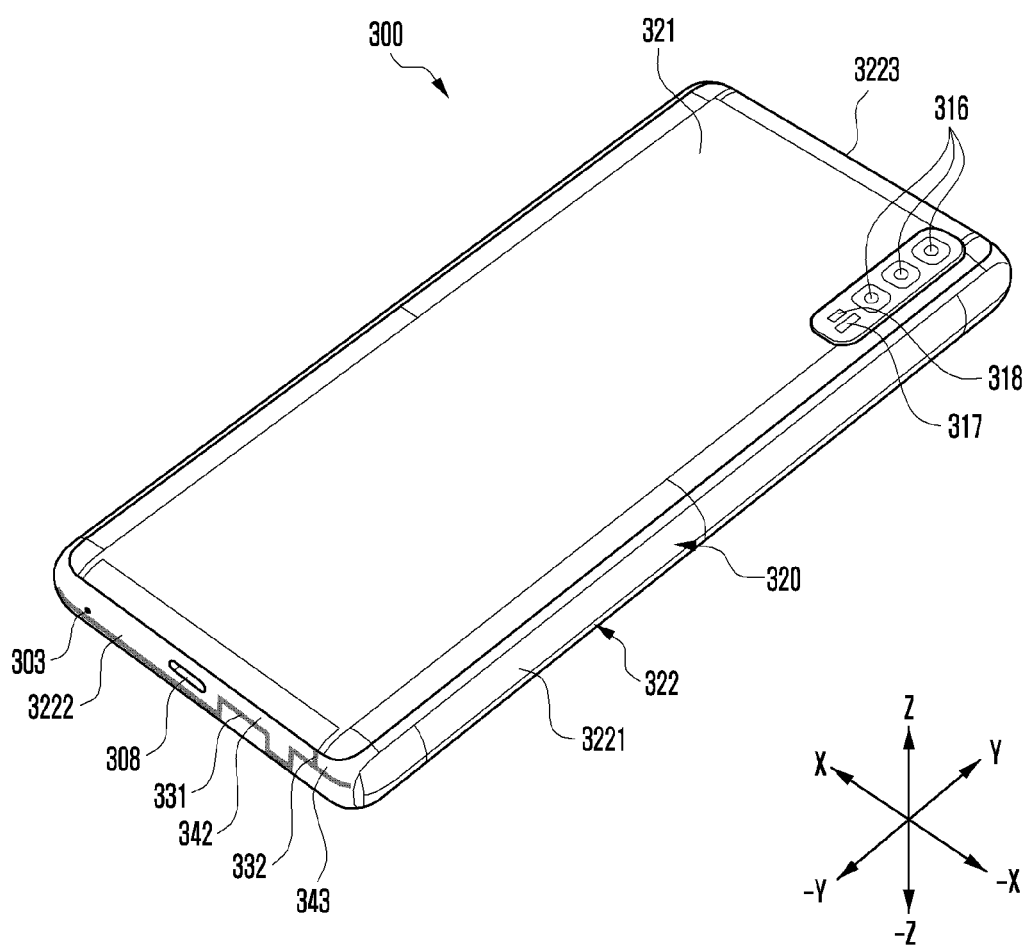
FIG. 5 is a rear perspective view of an electronic device showing a closed state according to various embodiments of the disclosure.
Figure 6:
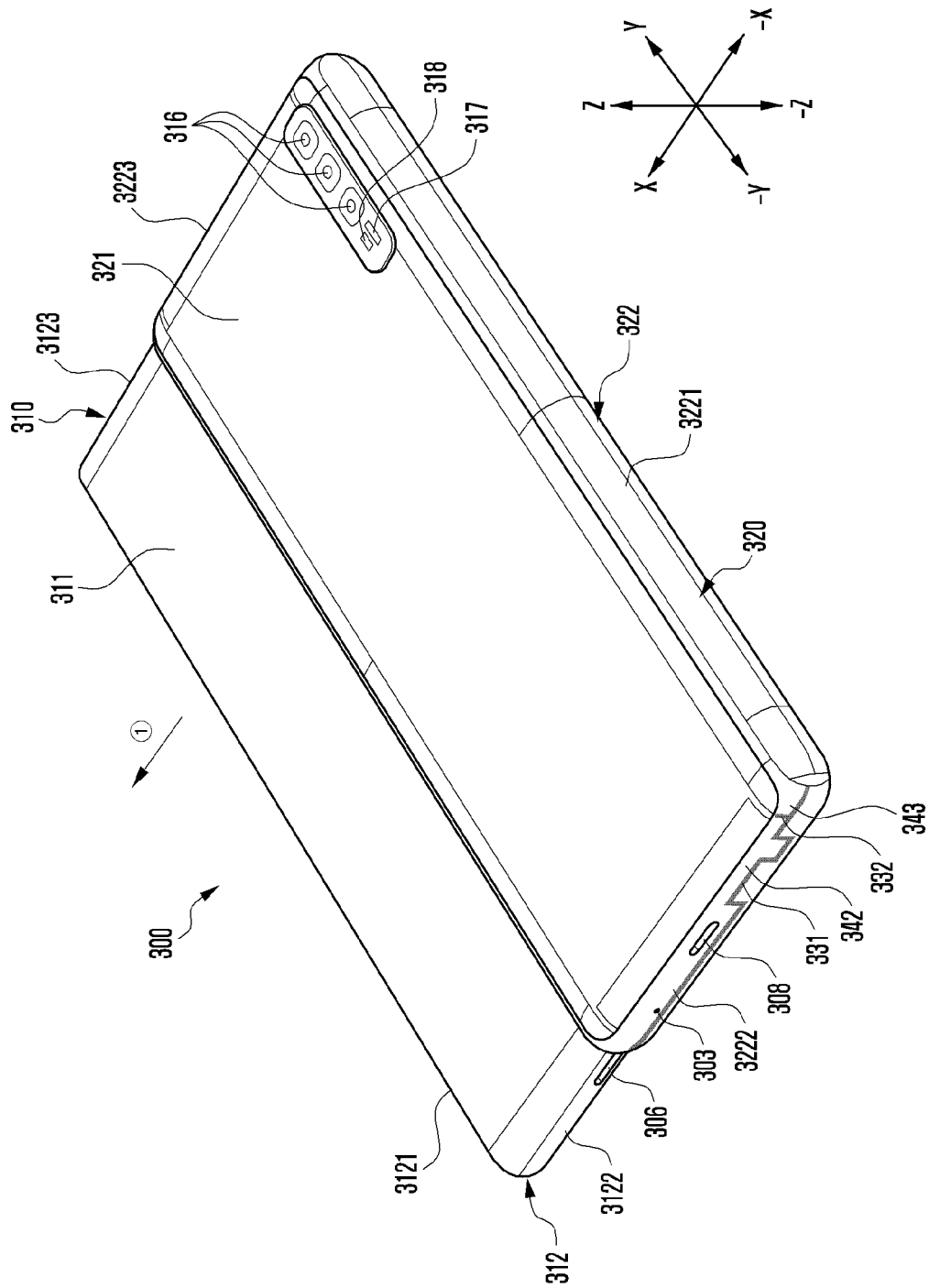
FIG. 6 is a rear perspective view of an electronic device showing an open state according to various embodiments of the disclosure.

FIG. 3 is a front perspective view of an electronic device showing a closed state according to various embodiments of the disclosure. FIG. 4 is a front perspective view of an electronic device showing an open state according to various embodiments of the disclosure. FIG. 5 is a rear perspective view of an electronic device showing a closed state according to various embodiments of the disclosure. FIG. 6 is a rear perspective view of an electronic device showing an open state according to various embodiments of the disclosure.

An electronic device 300 in FIGS. 3 to 6 may be at least partially similar to the electronic device 101 in FIG. 1, or may further include other embodiments of the electronic device.

Referring to FIGS. 3 to 6, the electronic device 300 may include a first housing 310 and a second housing 320 that is at least partially movably coupled to the first housing 310.

According to various embodiments, the first housing 310 may include a first plate 311, and a first side frame 312 that is disposed along the edge of the first plate 311 and is formed substantially in the direction of the −Z axis along the edge of the first plate 311. According to an embodiment, the first side frame 312 may include a first side face 3121, a second side face 3122 that extends from one end of the first side face 3121, and a third side face 3123 that extends from the opposite end of the first side face 3121. According to an embodiment, the first housing 310 may include a first space (not shown) that is at least partially closed from the outside by the first plate 311 and the first side frame 312.

According to various embodiments, the second housing 320 may include a second plate 321, and a second side frame 322 that is disposed along the edge of the second plate 321 and is substantially formed in the vertical direction (e.g., the direction of the −Z axis) from the edge of the second plate 321. According to an embodiment, the second side frame 322 may include a fourth side face 3221 that faces in the opposite direction (e.g., the direction of the −X axis) of the first side face 3121, a fifth side face 3222 that extends from one end of the fourth side face 3221 and at least partially overlaps the second side face 3122, and a sixth side face 3223 that extends from the opposite end of the fourth side face 3221 and at least partially overlaps the third side face 3123. According to an embodiment, the second housing 320 may include a second space (not shown) that is at least partially closed from the outside by the second plate 321 and the second side frame 322.

According to an embodiment, the first plate 311 and/or the second plate 321 may be disposed to at least partially form the rear surface of the electronic device 300.

According to an embodiment, the first plate 311, the second plate 321, the first side frame 312, and the second side frame 322 may be formed of polymer, coated or tinted glass, ceramic, metal (e.g., aluminum, stainless steel (STS), or magnesium), or a combination of at least two thereof.

According to various embodiments, the electronic device 300 may include a flexible display (or rollable display) 330 that is disposed to be supported by the first housing 310 and the second housing 320.

According to an embodiment, the electronic device 300 may be configured such that the first housing 310 can at least partially slide into (or be inserted into) the second space of the second housing 320 and reciprocate in a first direction (e.g., the direction ①, the direction of the X axis).

According to various embodiments, the state in which the first housing 310 is at least partially slid into the second space of the second housing 320 may be defined as a first state (e.g., a closed state, hereinafter referred to as a "closed state") of the electronic device.

According to various embodiments, the state in which the first housing 310 is slid out of the second space of the second housing 320 may be defined as a second state (e.g., an open state, hereinafter referred to as an "open state") of the electronic device.

According to various embodiments, the first state may be referred to as a first form, and the second state may be referred to as a second form. For example, the first form may include a normal state, a reduced state, or a closed state, and the second form may include an open state. In an embodiment, the electronic device 300 may form a third state (e.g., an intermediate state) between the first state and the second state. For example, the third state may be referred to as a third form, and the third form may include a free stop state.

According to an embodiment, at least a portion of the first housing 310 may slide out of the second space of the second housing 320 in the open state. For example, the first housing 310 may slide out of the second space of the second housing 320 in the first direction (the direction of the X axis). According to an embodiment, as the first housing 310 slides out of the second space of the second housing 320, the display area of the flexible display 330 may be expanded. For example, when the first housing 310 slides in the first direction (the direction of the X axis), the display area of the flexible display 330 may expand in the first direction (the direction of the X axis). That is, when the first housing 310 slides in the first direction (the direction of the X axis), the area of the flexible display 330 visible to the outside may increase.

According to an embodiment, the flexible display 330 may include a first portion 391 (e.g., a fixed display area) that is always visible to the outside in the open state and the closed state, and a second portion 392 (e.g., a variable display area) that is visible to the outside in the intermediate state or the open state. The first portion 391 of the flexible display 330 may have a first size, and the second portion 392 of the flexible display 330 may have a second size.

According to an embodiment, the second portion 392 of the flexible display 330 may be received in the first space of the first housing 310 or in the second space of the second housing 320 in the closed state. According to an embodiment, in the intermediate state or the open state, at least a part of the second portion 392 of the flexible display 330 may slide out of the first space of the first housing 310 or the second space of the second housing 320 to be visible to the outside of the electronic device 300. For example, according to an embodiment, in conjunction with the sliding movement of the first housing 310 in the first direction (the direction of the X axis), the second portion 392 of the flexible display 330 may slide out of the first space of the first housing 310 or the second space of the second housing 320 to be visible to the outside.

According to an embodiment, the electronic device 300 may include a guide member (not shown) for guiding the movement of the second portion 392 of the flexible display 330 in conjunction with the sliding movement of the first housing 310. For example, the guide member may include a roller (not shown) that rotates according to the sliding movement of the first housing 310, a multi joint hinge (not shown) that is provided to surround the outer circumferential surface of the roller and slides the second portion 392 of the flexible display 330 in or out, based on the rotation of the roller, and/or a slide plate (not shown) that is coupled to the multi joint hinge and supports the second portion 392 of the flexible display 330 that is visible to the outside in conjunction with the sliding movement of the first housing 310. According to various embodiments, the structure of the guide member (not shown) for guiding the movement of the second portion 392 of the flexible display 330 in conjunction with the sliding movement of the first housing 310 may be modified or changed in various ways.

According to an embodiment, at least a portion of the first housing 310 may slide into the second space of the second housing 320 in the closed state. For example, according to an embodiment, the direction in which the first housing 310 slides into the second space of the second housing 320 may be the second direction (the direction of the −X axis) opposite the first direction (the direction of the X axis).

Referring to FIG. 3, the electronic device 300 according to an embodiment may maintain the combined state of the first housing 310 and the second housing 320 such that the first side 3121 and the fourth side face 3221 have a first distance d1 therebetween in the closed state.

According to an embodiment, the flexible display 330 may have a display area of the first size in the closed state in which only the first portion 391 is visible to the outside and the second portion 392 is not visible to the outside. According to an embodiment, the flexible display 330 may have a first width corresponding to the first distance d1 in the closed state.

Referring to FIG. 4, in the open state, the electronic device 300 according to an embodiment may maintain the state in which the first housing 310 is slid out of the second housing 320 or is extracted therefrom such that the first side face 3121 is spaced a second distance d (d=d1+d2) from the fourth side face 3221, which is expanded by a distance d2.

According to an embodiment, the display area of the flexible display 330 may be expanded by the second size corresponding to the area of the second portion 392 in the open state. For example, since the first portion 391 and the second portion 392 are visible to the outside in the open state, the flexible display 330 may have a display area of a size that is the sum of the first size and the second size. According to an embodiment, the flexible display 330 may have a second width corresponding to the distance d that is the sum of the first distance d1 and the second distance d2 in the open state, and the second width may be greater than the first width.

According to an embodiment, the electronic device 300 may automatically switch between the open state and the closed state by operation of a driving unit (not shown) disposed in the first space of the first housing 310 and/or the second space of the second housing 320. According to another embodiment, the electronic device 300 may switch between the open state and the closed state by a manual manipulation of the user. In this case, the first housing 310 may protrude to an extent desired by the user, and the flexible display 330 may vary to have display areas of various sizes.

According to an embodiment, the processor (e.g., the processor 120 in FIG. 1) of the electronic device 300 may control the flexible display 330 to display objects in various ways and to execute applications (or programs) to correspond to the variable display area of the flexible display 330.

According to various embodiments, the electronic device 300 may include at least one of an input device 303, sound output devices 306 and 307, sensor modules 304 and 317, camera modules 305 and 316, a connector port 308, a key input device (not shown), or an indicator (not shown). According to another embodiment, the electronic device 300 may exclude at least one of the elements described above, or further include other elements in addition thereto.

According to various embodiments, the input device 303 may include a microphone. In some embodiments, the input device 303 may include a plurality of microphones disposed to detect the direction of sound. The sound output devices 306 and 307 may include speakers. The sound output devices 306 and 307 may include an external speaker 306 and/or a receiver 307 for calls. According to another embodiment, if the external speaker 306 is disposed in the first housing 310, it may be configured such that sound is output through a speaker hole formed in the second housing 320 in the closed state. According to an embodiment, the input device 303 and the connector port 308 may also be configured to have substantially the same configuration. According to another embodiment, the sound output devices 306 and 307 may include a speaker (e.g., a piezo speaker) that operates without a separate speaker hole.

According to various embodiments, the sensor modules 304 and 317 may produce an electrical signal or a data value corresponding to the internal operating state of the electronic device 300 or the external environmental state. The sensor modules 304 and 317 may include, for example, a first sensor module 304 (e.g., a proximity sensor or an illuminance sensor) disposed on the front surface of the second housing 320 and/or a second sensor module 317 (e.g., a heart rate monitor (HRM) sensor) disposed on the rear surface of the second housing 320. According to an embodiment, the first sensor module 304 may be disposed under the flexible display 330 in the second housing 320. According to an embodiment, the first sensor module 304 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera devices 305 and 316 may include a first camera device 305 disposed on the front surface of the second housing 320, and a second camera device 316 disposed on the rear surface of the second housing 320. According to an embodiment, the electronic device 300 may include a flash 318 positioned near the second camera device 316. According to an embodiment, the camera devices 305 and 316 may include one or more lenses, an image sensor, and/or an image signal processor. According to an embodiment, the first camera device 305 may be disposed under the flexible display 330, and may be configured to photograph a subject through a portion of an active area of the flexible display 330. According to an embodiment, the flash 318 may include, for example, a light-emitting diode or a xenon lamp. In some embodiments, two or more lenses (e.g., wide-angle and telephoto lenses) and image sensors may be arranged on one side of the electronic device 300.

According to various embodiments, the electronic device 300 may include at least one antenna (not shown). According to an embodiment, the at least one antenna may, for example, wirelessly communicate with an external electronic device (e.g., the electronic device 104 in FIG. 1), or wirelessly transmit/receive power required for charging. According to an embodiment, the antenna may include a legacy antenna, a mmWave antenna, a near field communication (NFC) antenna (e.g., the NFC antenna 297-3 in FIG. 2), a wireless charging antenna (e.g., the wireless charging antenna 297-5 in FIG. 2), and/or a magnetic secure transmission (MST) antenna (e.g., the MST antenna 297-1 in FIG. 2).

According to various embodiments, an antenna structure may be formed by at least a portion of the first side frame 312 and/or the second side frame 322 that include a conductive material such as metal. According to various embodiments, the electronic device 300 may include a plurality of conductive portions 341, 342, 343, and 344 formed through a fifth side face 3222 of the second side frame 322. According to an embodiment, the plurality of conductive portions 341, 342, 343, and 344 may be arranged to be electrically disconnected through a plurality of non-conductive portions 331, 332, and 333.

According to an embodiment, the plurality of conductive portions 341, 342, 343, and 344 may include a first conductive portion 341, a second conductive portion 342, a third conductive portion 343, and/or a fourth conductive portion 344, which are electrically disconnected through the plurality of non-conductive portion 331, 332, and 333. According to an embodiment, the electronic device 300 may use at least one conductive portion 341 or 342 among the plurality of conductive portions 341, 342, 343, and 344 as an antenna. According to an embodiment, the electronic device 300 may include a wireless communication circuit (e.g., the wireless communication module 192 in FIG. 1), which may be configured to be electrically connected to at least one conductive portion 341 or 342 among the plurality of conductive portions 341, 342, 343, and 344, thereby transmitting and/or receiving wireless signals in a specified frequency band (e.g., a legacy band).

An electronic device (e.g., the electronic device 300 in FIG. 3) according to various embodiments of the disclosure may include a housing comprised of a first housing (e.g., the first housing 310 in FIG. 4) and a second housing (e.g., the second housing 320 in FIG. 4) and configured such that the first housing 310 slides in a first direction (the direction of the X axis) with respect to the second housing 320. The electronic device may further include a short-range communication module (e.g., the wireless communication module 192 in FIG. 2 or the wireless charging module 250 in FIG. 2) located inside the housing, a circuit board (e.g., the circuit board 701 in FIG. 7) located inside the housing and including a first coil (e.g., the first coil 711 in FIG. 7) and a second coil (e.g., the second coil 712 in FIG. 8) selectively connected to the short-range communication module (e.g., the wireless communication module 192 in FIG. 2 or the wireless charging module 250 in FIG. 2), and a processor (e.g., the processor 120 in FIG. 1) located inside the housing, wherein the processor 120 may be configured to activate a short-range communication function using the short-range communication module (e.g., the wireless communication module 192 in FIG. 2 or the wireless charging module 250 in FIG. 2), perform the short-range communication function using the first coil 711 in a closed state in which at least a portion of the first housing 310 is slid into the inner space of the second housing 320, and perform the short-range communication function using the second coil 712 in an open state in which at least a portion of the first housing 310 is slid out of the inner space of the second housing 320, wherein the center (e.g., the center C1 in FIG. 7) of the first coil 711 may be disposed to be aligned with a first central axis (e.g., the axis A in FIG. 7) crossing the center of the electronic device 300 in the closed state, and wherein the center (e.g., the center C2 in FIG. 8) of the second coil 712 may be disposed to be aligned with a second central axis (e.g., the axis B in FIG. 8) crossing the center of the electronic device 300 in the open state.

According to an embodiment, the first central axis (the axis A) may cross the center C1 of the first coil 711, and the second central axis (the axis B) may cross the center C2 of the second coil 712.

According to an embodiment, the center C1 of the first coil 711 may be disposed within a specified distance from the first central axis (the axis A), and the center C2 of the second coil 712 may be disposed within a specified distance from the second central axis (the axis B) and may be offset in the first direction (the direction of the X axis) from the center C1 of the first coil 711.

According to an embodiment, the first coil 711 may form a loop-shaped antenna that is wound a specified number of times in a specified direction around the center C1 of the first coil 711, and the loop-shaped antenna may be formed such that portions of the first coil 711 that are adjacent to each other in the loop-shaped antenna have the same gap therebetween.

According to an embodiment, the first coil 711 may include first portions 911 disposed in the first direction (the direction of the X axis) with respect to the center C1 of the first coil 711, and second portions 912 disposed in a second direction (the direction of the −X axis) opposite the first direction (the direction of the X axis) with respect to the center C1 of the first coil 711, and a first gap between the first portions 911 that are adjacent to each other may be the same as a second gap between the second portions 912 that are adjacent to each other.

According to an embodiment, the second coil 712 may form a loop-shaped antenna wound a specified number of times in a specified direction around the center C2 of the second coil 712, and the loop-shaped antenna may be formed such that the gap between portions of the second coil 712 that are adjacent to each other in the loop-shaped antenna increases with distance from the center C2 in the first direction (the direction of the X axis).

According to an embodiment, the second coil 712 may include third portions 921 disposed in the first direction (the direction of the X axis) with respect to the center C2 of the second coil 712 and fourth portions 922 disposed in a second direction (the direction of the −X axis) opposite the first direction (the direction of the X axis) with respect to the center C2 of the second coil 712, and the gap between the fourth portions 922 that are adjacent to each other may be greater than a third gap between the third portions 921 that are adjacent to each other.

According to an embodiment, the gap between the fourth portions 922 that are adjacent to each other may increase in the first direction (the direction of the X axis).

According to an embodiment, the third portions 921 may be formed to have a first line width, and the fourth portions 922 may be formed to have a second line width smaller than the first line width.

According to an embodiment, the short-range communication module (e.g., the wireless communication module 192 in FIG. 2 or the wireless charging module 250 in FIG. 2) may include at least one of an MST communication module, an NFC communication module, or a wireless charging module.

According to an embodiment, the first coil 711 and the second coil 712 may be formed on different layers of the circuit board 701 from each other.

According to an embodiment, the processor may be configured to activate the first coil 711 and deactivate the second coil 712, based on switching of the electronic device 300 from the open state to the closed state.

According to an embodiment, the processor may be configured to activate the second coil 712 and deactivate the first coil 711, based on switching of the electronic device 300 from the closed state to the open state.

A method of an electronic device 300 according to various embodiments of disclosure may include performing a short-range communication function using the first coil 711 in a closed state in which at least a portion of the first housing 310 of the electronic device 300 is slid into the inner space of the second housing 320 of the electronic device 300, and performing the short-range communication function using the second coil 712 in an open state in which at least a portion of the first housing 310 is slid out of the inner space of the second housing 320.

According to an embodiment, the method may further include activating the first coil 711 and deactivating the second coil 712, based on switching of the electronic device 300 from the open state to the closed state.

According to an embodiment, the method may further include activating the second coil 712 and deactivating the first coil 711, based on switching of the electronic device 300 from the closed state to the open state.

According to an embodiment, a first central axis (the axis A) crossing the center of the electronic device 300 may cross the center C1 of the first coil 711 in the closed state, and a second central axis (the axis B) crossing the center of the electronic device 300 may cross the center C2 of the second coil 712 in the open state.

According to an embodiment, the center C1 of the first coil 711 may be disposed within a specified distance from the first central axis (the axis A), and the center C2 of the second coil 712 may be disposed within a specified distance from the second central axis (the axis B) and may be offset in the first direction (the direction of X) from the center C1 of the first coil 711.

According to an embodiment, the first coil 711 may include a first portion 911 formed in the first direction (the direction of X) with respect to the center C1 of the first coil 711, and a second portion 912 formed in a second direction (the direction of −X) opposite the first direction (the direction of X) with respect to the center C1 of the first coil 711, and a first gap between the first portions 911 adjacent to each other may be the same as a second gap between the second portions 912 adjacent to each other.

According to an embodiment, the second coil 712 may include a third portion 921 formed in the first direction (the direction of X) with respect to the center C2 of the second coil 712 and a fourth portion 922 formed in a second direction (the direction of −X) opposite the first direction (the direction of X) with respect to the center C2 of the second coil 712, and the gap between the fourth portions 922 adjacent to each other may be greater than a third gap between the third portions 921 adjacent to each other.

Figure 7:
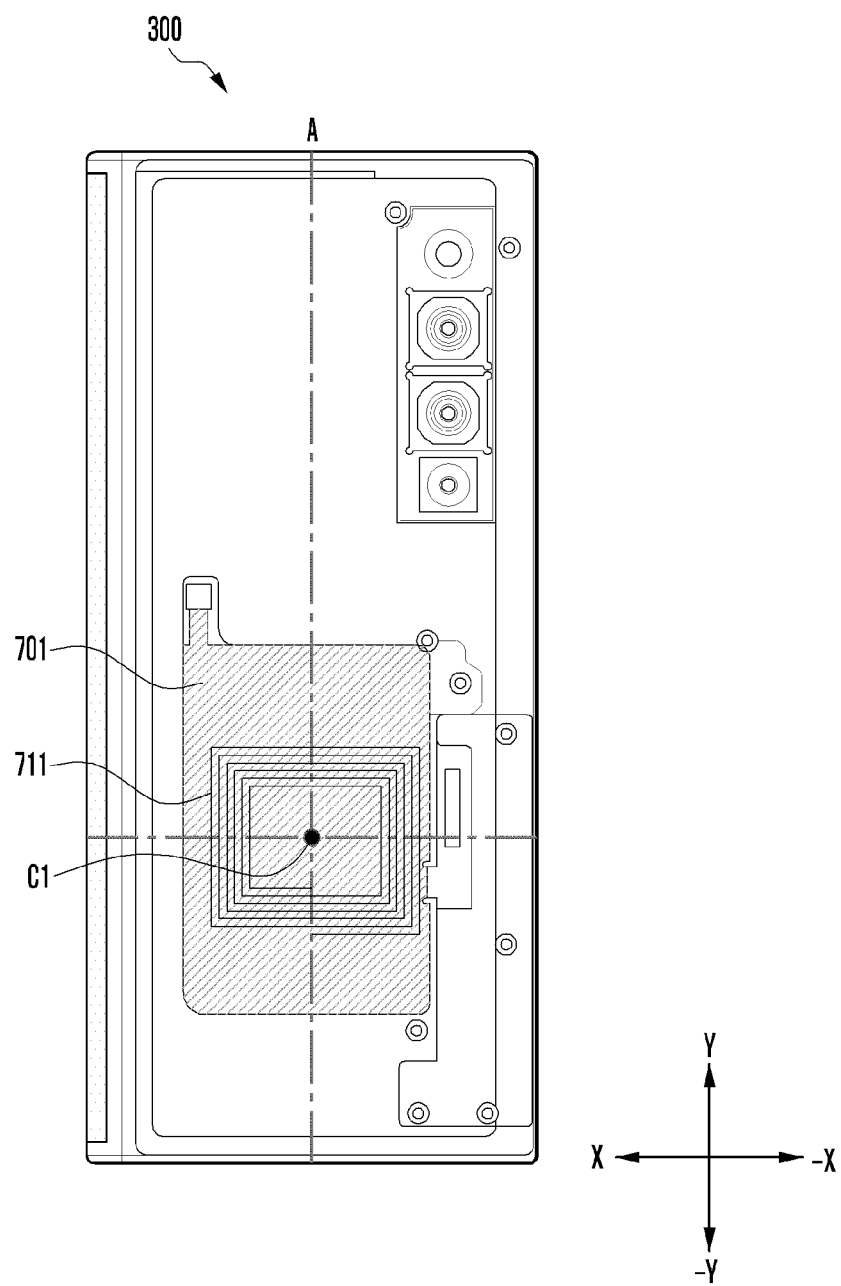
FIG. 7 is an example illustrating a rear surface of an electronic device showing a closed state according to various embodiments of the disclosure.

FIG. 7 is an example illustrating a rear surface of an electronic device 300 showing a closed state of the device according to various embodiments of the disclosure. FIG. 7 may be an example illustrating the state in which at least a portion of a rear cover (e.g., the second plate 321 in FIG. 5) of the electronic device 300 is detached therefrom in the closed state.

The electronic device 300 shown in FIG. 7 may be at least partially similar to the electronic device 300 in FIGS. 3 to 6, or include other embodiments thereof. Hereinafter, a description will be made based on the features of the electronic device 300 that have not been described in FIGS. 3 to 6 or that differ from those therein with reference to FIG. 7.

Referring to FIG. 7, the electronic device 300 (e.g., the electronic device 101 in FIG. 1) may include a circuit board 701 on which a first coil 711 is formed in a loop shape as an antenna for short-range communication. According to an embodiment, the circuit board 701 may be disposed in at least a portion of a second space in the second housing 320. According to various embodiments, the circuit board 701 may be a flexible printed circuit board (FPCB) or a non-flexible printed circuit board (PCB). The first coil 711 may be positioned on a structure made of a non-conductive material such as an antenna carrier, as well as on the circuit board 701.

Hereinafter, the first coil 711 according to various embodiments described in the disclosure may include an NFC antenna (e.g., the NFC antenna 297-3 in FIG. 2), a wireless charging antenna (e.g., the wireless charging antenna 297-5 in FIG. 2), or an MST antenna (e.g., the MST antenna 297-1 in FIG. 2). For example, the first coil 711 according to various embodiments described in the disclosure may be a coil for NFC communication, a coil for MST communication, or a coil for a wireless charging function. According to some embodiments, the characteristics of the first coil 711 according to various embodiments described in the disclosure may be applied to some or all of the coil for NFC communication, the coil for MST communication, and the coil for the wireless charging function.

Referring to FIG. 7, the circuit board 701 may include a first coil 711 for supporting short-range communication functions (e.g., a wireless charging function, an MST communication function, or an NFC communication function) of the electronic device 300 in the closed state.

According to an embodiment, the first coil 711 may form an antenna radiator in a loop shape, which is wound a specified number of times in a specified direction (e.g., clockwise or counterclockwise) around the center C1 of the first coil 711.

According to an embodiment, the center C1 of the first coil 711 may be disposed to overlap with or be adjacent to the first central axis (the axis A) of the electronic device 300 that substantially crosses the center of the electronic device 300 in the closed state. For example, the first central axis (the axis A) of the electronic device 300 that crosses the center of the electronic device 300 in the closed state may cross the center C1 of the first coil 711.

According to an embodiment, the center of the electronic device 300 in the closed state may be defined as a virtual point positioned substantially at the center of the electronic device 300 when the rear surface of the electronic device 300 in the closed state is viewed on the XY plane. According to an embodiment, assuming that the electronic device 300 in the closed state has a rectangular form that is longer in the Y axis direction than in the X axis direction, the first central axis (the axis A) of the electronic device 300 may be defined as being substantially parallel to the Y axis direction.

According to an embodiment, in the closed state, the processor (e.g., the processor 120 in FIG. 1) of the electronic device 300 may activate the first coil 711, based on an event for executing the short-range communication function (e.g., the wireless charging function, the MST communication function, or the NFC communication function), and perform short-range communication using the first coil 711 in the closed state. According to an embodiment, the electronic device 300 may activate the first coil 711 in the closed state so that the magnetic field formed by the first coil 711 may not be eccentric in one direction (e.g., the X axis direction or the −X axis direction) from the center of the electronic device 300, thereby preventing deterioration of the antenna efficiency in performing short-range communication. According to an embodiment, the event for executing the short-range communication function may be one of various user inputs to the electronic device 300, which may include, for example, a touch input on a display (e.g., the display module 160 in FIG. 1), a voice input, or an input of pressing a physical button exposed to the outside of the electronic device 300.

According to an embodiment, the operation of activating the first coil 711 may be defined as an operation of electrically (or operably) connecting the first coil 711 with the wireless communication module (e.g., the wireless communication module 192 in FIG. 2). According to an embodiment, the operation of deactivating the first coil 711 may be defined as an operation of electrically (or operably) disconnecting the first coil 711 from the wireless communication module 192.

According to an embodiment, the processor 120 of the electronic device 300 may activate the first coil 711 and deactivate the second coil (e.g., the second coil 712 in FIG. 8) based on switching of the electronic device 300 from the open state to the closed state while the short-range communication function is activated.

According to another embodiment, in the closed state, the first central axis (the axis A) of the electronic device 300 that crosses the center of the electronic device 300 may not cross the center C1 of the first coil 711. For example, the center C1 of the first coil 711 may be positioned within a specified distance from the first central axis (the axis A) of the electronic device 300. In an embodiment, the specified distance may be determined based on the size of the electronic device 300 and the size of the first coil 711.

Figure 8:
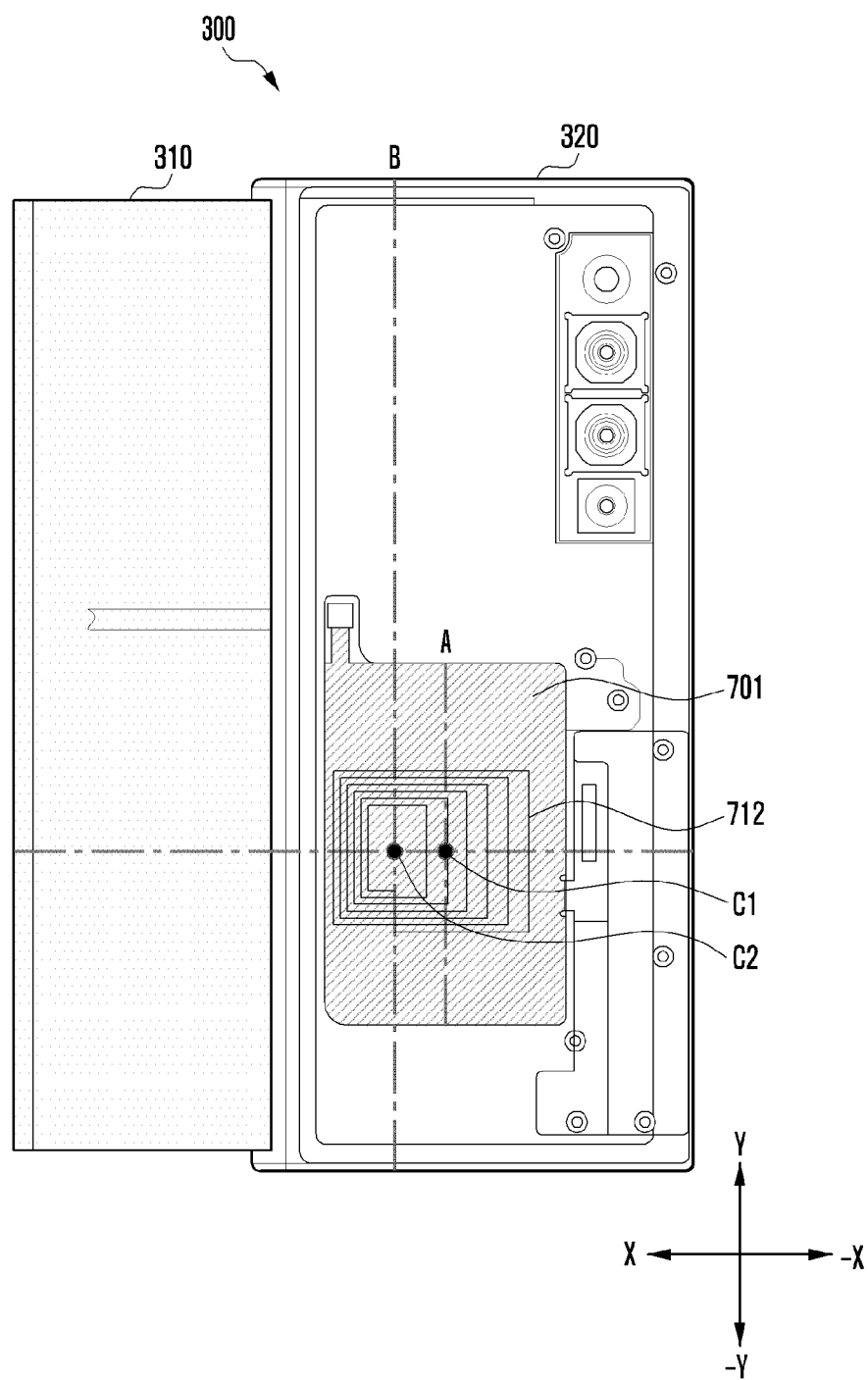
FIG. 8 is an example illustrating a rear surface of an electronic device showing an open state according to various embodiments of the disclosure.

FIG. 8 is an example illustrating a rear surface of an electronic device 300 showing an open state of the device according to various embodiments of the disclosure. FIG. 8 may be an example illustrating the state in which at least a portion of a rear cover (e.g., the second plate 321 in FIG. 5) of the electronic device 300 is detached therefrom in the open state.

The electronic device 300 shown in FIG. 8 may be at least partially similar to the electronic device 300 in FIGS. 3 to 7, or include other embodiments thereof. Hereinafter, a description will be made based on the features of the electronic device 300 that have not been described in FIGS. 3 to 7 or that differ from those therein with reference to FIG. 8.

Referring to FIG. 8, the electronic device 300 (e.g., the electronic device 101 in FIG. 1) may include a circuit board 701 on which a second coil 712 is formed in a loop shape as an antenna for short-range communication.

According to an embodiment, the circuit board 701 illustrated in FIG. 8 may be the same as the circuit board 701 including the first coil 711, which is described with reference to FIG. 7. According to an embodiment, the circuit board 701 may include a plurality of layers, and the first coil 711 and the second coil 712 may be formed on different layers among the plurality of layers. For example, the first coil 711 may be formed on the first layer (not shown) of the circuit board 701, and the second coil 712 may be formed on the second layer (not shown), which is different from the first layer. In some embodiments, at least a portion of the first coil 711 and at least a portion of the second coil 712 may be formed on the same layer.

According to an embodiment, the circuit board 701 illustrated in FIG. 8 may be different from the circuit board 701 including the first coil 711, which is described with reference to FIG. 7. For example, the first coil 711 may be disposed on the circuit board 701 in FIG. 7, and the second coil 712 may be disposed on the circuit board 701 in FIG. 8. In this case, the circuit board 701 including the first coil 711 and the circuit board 701 including the second coil 712 may be disposed such that the center C1 of the first coil 711 does not overlap the center C2 of the second coil 712.

According to an embodiment, the second coil 712 may be positioned on a structure made of a non-conductive material such as an antenna carrier, as well as on the circuit board 701. In this case, the first coil 711 and the second coil 712 may be arranged such that the center C1 of the first coil 711 does not overlap the center C2 of the second coil 712.

Hereinafter, the second coil 712 according to various embodiments described in the disclosure may include an NFC antenna (e.g., the NFC antenna 297-3 in FIG. 2), a wireless charging antenna (e.g., the wireless charging antenna 297-5 in FIG. 2), or an MST antenna (e.g., the MST antenna 297-1 in FIG. 2). For example, the second coil 712 according to various embodiments described in the disclosure may be a coil for NFC communication, a coil for MST communication, or a coil for a wireless charging function. According to some embodiments, the characteristics of the second coil 712 according to various embodiments described in the disclosure may be applied to some or all of the coil for NFC communication, the coil for MST communication, and the coil for the wireless charging function.

Referring to FIG. 8, the circuit board 701 may include a second coil 712 for supporting short-range communication functions (e.g., a wireless charging function, an MST communication function, or an NFC communication function) of the electronic device 300 in the open state.

According to an embodiment, the second coil 712 may form an antenna radiator in a loop shape, which is wound a specified number of times in a specified direction (e.g., clockwise or counterclockwise) around the center C2 of the second coil 712.

According to an embodiment, the second coil 712 may be configured to perform communication in substantially the same frequency band as the first coil 711.

According to an embodiment, the center C2 of the second coil 712 may be disposed to overlap with or be adjacent to the second central axis (the axis B) of the electronic device 300 that crosses substantially the center of the electronic device 300 in the open state. For example, the second central axis (the axis B) of the electronic device 300 that crosses the center of the electronic device 300 in the open state may cross the center C2 of the second coil 712.

According to an embodiment, the center of the electronic device 300 in the open state may be defined as a virtual point positioned substantially at the center of the electronic device 300 when the rear surface of the electronic device 300 in the open state is viewed on the XY plane. According to an embodiment, assuming that the electronic device 300 in the closed state has a rectangular form that is longer in the Y axis direction than in the X axis direction, the second central axis (the axis B) of the electronic device 300 may be defined as being substantially parallel to the Y axis direction.

According to an embodiment, in the open state, a portion of the first housing 310 of the electronic device 300 may slide out of the second housing 320 in the first direction (the direction of the X axis), and accordingly, the second central axis (the axis B) of the electronic device 300 may be offset in the first direction (the direction of the X axis) from the first central axis (the axis A) of the electronic device 300. For example, the center C2 of the second coil 712 may be offset in the first direction (the direction of the X axis) from the center C1 of the first coil 711.

According to an embodiment, the processor (e.g., the processor 120 in FIG. 1) of the electronic device 300 may activate the second coil 712, based on an event for executing the short-range communication function (e.g., the wireless charging function, the MST communication function, or the NFC communication function), and perform short-range communication using the second coil 712 in the open state. According to an embodiment, the electronic device 300 may activate the second coil 712 in the open state so that the magnetic field formed by the second coil 712 may not be eccentric in one direction (e.g., the X axis direction or the −X axis direction) from the center of the electronic device 300, thereby preventing deterioration of the antenna efficiency in performing short-range communication. According to an embodiment, the event for executing the short-range communication function may be one of various user inputs to the electronic device 300, which may include, for example, a touch input on a display (e.g., the display module 160 in FIG. 1), a voice input, or an input of pressing a physical button exposed to the outside of the electronic device 300.

According to an embodiment, the operation of activating the second coil 712 may be defined as an operation of electrically (or operably) connecting the second coil 712 with the wireless communication module (e.g., the wireless communication module 192 in FIG. 2). According to an embodiment, the operation of deactivating the second coil 712 may be defined as an operation of electrically (or operably) disconnecting the second coil 712 from the wireless communication module 192.

According to an embodiment, the processor 120 of the electronic device 300 may activate the second coil 712 and deactivate the first coil 711 based on switching of the electronic device 300 from the closed state to the open state while the short-range communication function is activated.

According to another embodiment, in the open state, the second central axis (the axis B) of the electronic device 300 that crosses the center of the electronic device 300 may not cross the center C2 of the second coil 712. For example, the center C2 of the second coil 712 may be disposed within a specified distance from the second central axis (the axis B) of the electronic device 300, and may be offset in the first direction (the direction of the X axis) from the center C1 of the first coil 711.

According to an embodiment, in the intermediate state in which the electronic device 300 switches from the closed state to the open state while the short-range communication function is activated, the processor 120 of the electronic device 300 may activate whichever of the first coil 711 or the second coil 712 has its center (C1 or C2, respectively)

closest to the central axis crossing the center of the electronic device 300. For example, if the electronic device 300 switches to the intermediate state while the first coil 711 is activated in the closed state, and if the center C2 of the second coil 712 is closer to the central axis crossing the center of the electronic device 300 than the center C1 of the first coil 711, the processor 120 of the electronic device 300 may deactivate the first coil 711 and activate the second coil 712.

Figure 9A:
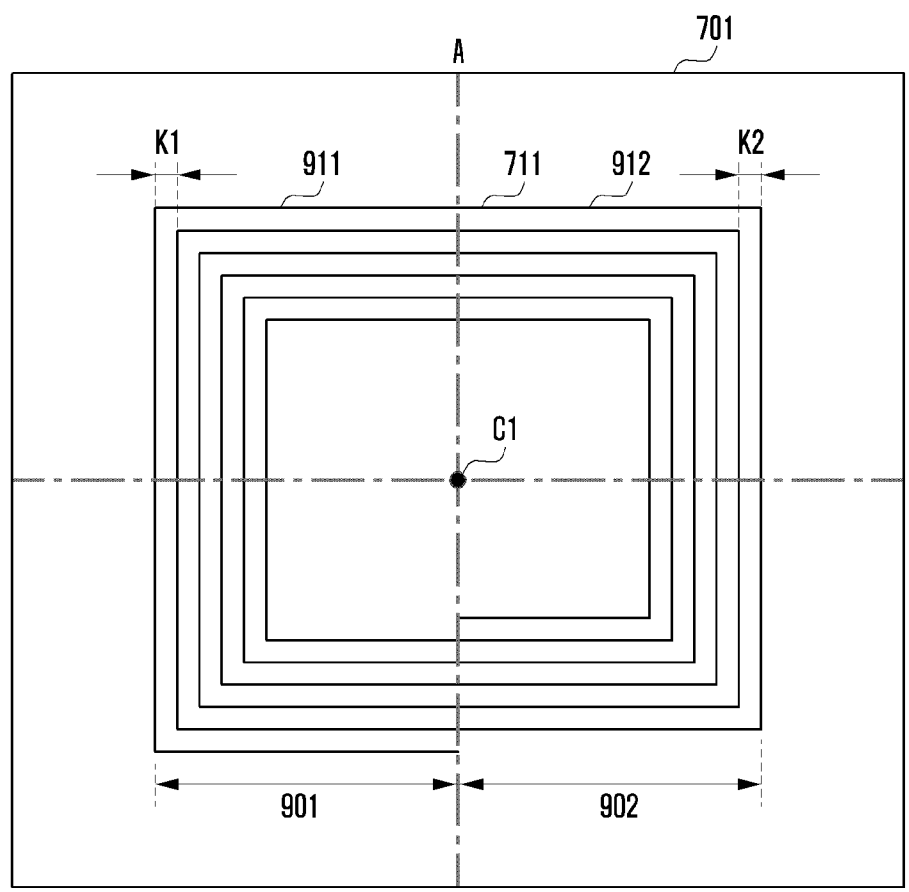
FIG. 9A is a plan view showing the form of a first coil.
Figure 9A:
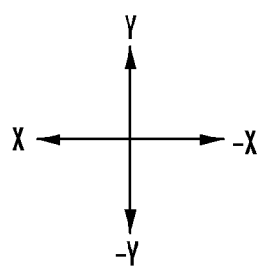
Figure 9B:
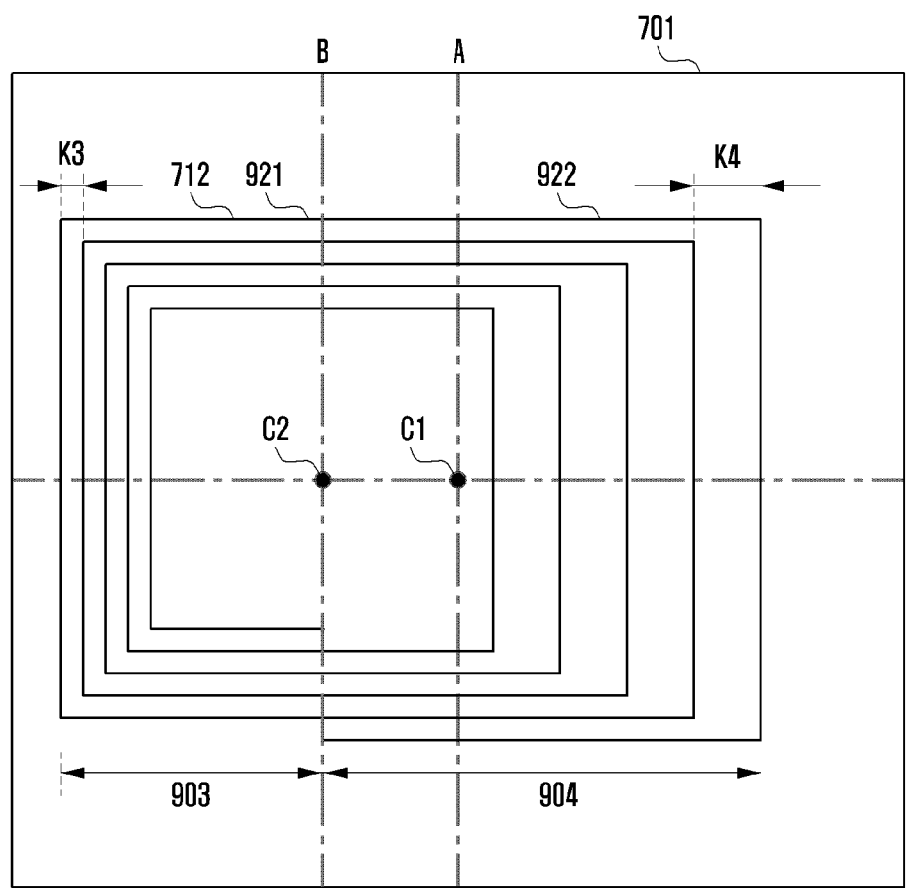
FIG. 9B is a plan view showing the form of a second coil.
Figure 9B:
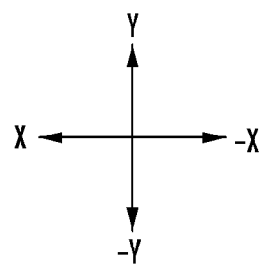

FIGS. 9A and 9B are examples illustrating the forms of coils according to various embodiments of the disclosure. For example, FIG. 9A may be a plan view showing the form of a first coil 711, and FIG. 9B may be a plan view showing the form of a second coil 712.

The coils 711 and 712 shown in FIGS. 9A and 9B may be at least partly similar to the coils 711 and 712 in FIGS. 7 to 8, or include other embodiments thereof. Hereinafter, a description will be made based on the features of the coils 711 and 712 that have not been described in FIGS. 7 to 8 or that differ from those therein with reference to FIGS. 9A and 9B.

Referring to FIG. 9A, the first coil 711 (e.g., the first coil 711 in FIG. 7) may form an antenna radiator in a loop shape, which is wound a specified number of times in a specified direction around the center C1 of the first coil 711.

According to an embodiment, the center C1 of the first coil 711 may be disposed on the first central axis (the axis A) of the electronic device 300 crossing the center of the electronic device 300 in the closed state. According to an embodiment, the first coil 711 may be separated into a first area 901 and a second area 902, based on the center C1 of the first coil 711.

According to an embodiment, the first area 901 of the first coil 711 is an area disposed in the first direction (the direction of the X axis) from the center C1 of the first coil 711, and may include first portions 911 of the first coil 711.

According to an embodiment, the second area 902 of the first coil 711 is an area disposed in the second direction (the direction of the −X axis) from the center C1 of the first coil 711, and may include second portions 912 of the first coil 711.

According to an embodiment, the first coil 711 may be wound to have a first gap K1 in the first area 901 of the first coil 711. For example, the first portions 911 of the first coil 711, which are disposed in the first direction (the direction of the X axis) from the center C1 of the first coil 711, may be arranged to have substantially a first gap K1 between adjacent first portions 911 of the first coil 711.

According to an embodiment, the first coil 711 may be wound to have a second gap K2 in the second area 902 of the first coil 711. For example, the second portions 912 of the first coil 711, which are disposed in the second direction (the direction of the −X axis) from the center C1 of the first coil 711, may be arranged to have substantially a second gap K2 between adjacent second portions 912 of the first coil 711. According to an embodiment, the second gap K2 may be substantially the same as the first gap K1. According to an embodiment, since the second gap K2 and the first gap K1 are substantially the same, the magnetic field generated by the first coil 711 may not be eccentric in a specific direction from the first central axis (the axis A) of the electronic device 300.

According to an embodiment, the gap of the first coil 711 (e.g., the first gap K1 or the second gap K2) may be defined as the shortest distance between a portion of the nth wound coil (or winding) and the (n+1)th wound coil (or winding). For example, the gap of the first coil 711 (e.g., the first gap K1 or the second gap K2) may be a distance between a portion of the nth wound coil and a portion of the (n+1)th wound coil, which may be the shortest distance between the nth wound coil and the (n+1)th wound coil in the direction (e.g., the +X or −X axis direction) parallel to the movement direction of the first housing 310 of the electronic device 300.

According to an embodiment, the processor 120 of the electronic device 300 may identify whether or not the electronic device is in the closed state while the short-range communication function is activated, and, if the electronic device is in the closed state, activate the first coil 711 so that the magnetic field of the electronic device 300 for short-range communication may be formed to be substantially symmetrical around the center of the electronic device 300 in the substantially closed state.

Referring to FIG. 9B, the second coil 712 (e.g., the second coil 712 in FIG. 8) may form an antenna radiator in a loop shape, which is wound a specified number of times in a specified direction around the center C2 of the second coil 712.

According to an embodiment, the center C2 of the second coil 712 may be disposed on the second central axis (the axis B) of the electronic device 300 crossing the center of the electronic device 300 in the open state. According to an embodiment, the second coil 712 may be separated into a third area 903 and a fourth area 904 with respect to the center C2 of the second coil 712 of the electronic device 300.

According to an embodiment, the third area 903 of the second coil 712 may be an area disposed in the first direction (the direction of the X axis) from the center C2 of the second coil 712, and may include third portions 921 of the second coil 712.

According to an embodiment, the fourth area 904 of the second coil 712 may be an area disposed in the second direction (the direction of the −X axis) from the center C2 of the second coil 712, and may include fourth portions 922 of the second coil 712.

According to an embodiment, the second coil 712 may be wound to have a third gap K3 in the third area 903 of the second coil 712. For example, the third portions 921 of the second coil 712, which are disposed in the first direction (the direction of the X axis) from the center C2 of the second coil 712 of the electronic device 300, may be arranged to have substantially a third gap K3 between adjacent third portions 921 of the second coil 712.

According to an embodiment, the second coil 712 may be wound to have a fourth gap K4 in the fourth area 904 of the second coil 712. For example, the fourth portions 922 of the second coil 712, which are disposed in the second direction (the direction of the −X axis) from the center C2 of the second coil 712 of the electronic device 300, may be arranged to have substantially a fourth gap K4 between adjacent fourth portions 922 of the second coil 712. According to an embodiment, the fourth gap K4 may be greater than the third gap K3. According to an embodiment, the fourth gap K4 may increase as the distance from the second central axis (the axis B) of the electronic device 300 increases. For example, the fourth portions 922 of the second coil 712, which are disposed in the second direction (the direction of the −X axis) from the second central axis (the axis B) of the electronic device 300, may be arranged such that the gap between adjacent fourth portions 922 increases as the distance from the second central axis (the axis B). In another embodiment, the fourth gap K4 may be constant as the distance from the second central axis (the axis B) of the electronic device 300 increases. According to an embodiment, the sum of the gaps between the fourth portions 922 of the second coil 712 arranged in the fourth area 904 may be greater than the sum of the gaps between the third portions 921 of the second coil 712 arranged in the third area 903.

In an embodiment wherein the fourth portions 922 of the second coil 712 are arranged such that the gap between adjacent fourth portions 922 increases as the distance from the second central axis (the axis B) increases, the magnetic field generated by the second coil 712 may not be eccentric in a specific direction from the second central axis (the axis B) of the device.

According to an embodiment, the gap of the second coil 712 (e.g., the third gap K3 or the fourth gap K4) may be defined as the shortest distance between a portion of the mth wound coil (or winding) and a portion of the (m+1)th wound coil (or winding). For example, the gap of the second coil 712 (e.g., the third gap K3 or the fourth gap K4) may be a distance between a portion of the mth wound coil and a portion of the (m+1)th wound coil, which may be the shortest distance between the mth wound coil and the (m+1)th wound coil in the direction (e.g., the X or −X axis direction) parallel to the movement direction of the first housing 310 of the electronic device 300.

According to an embodiment, the processor 120 of the electronic device 300 may identify whether or not the electronic device is in the open state while the short-range communication function is activated, and, if the electronic device is in the open state, activate the second coil 712 so that the magnetic field of the electronic device 300 for short-range communication may be formed to be substantially symmetrical around the central axis (the axis B) of the electronic device 300 in the substantially open state.

Figure 10:
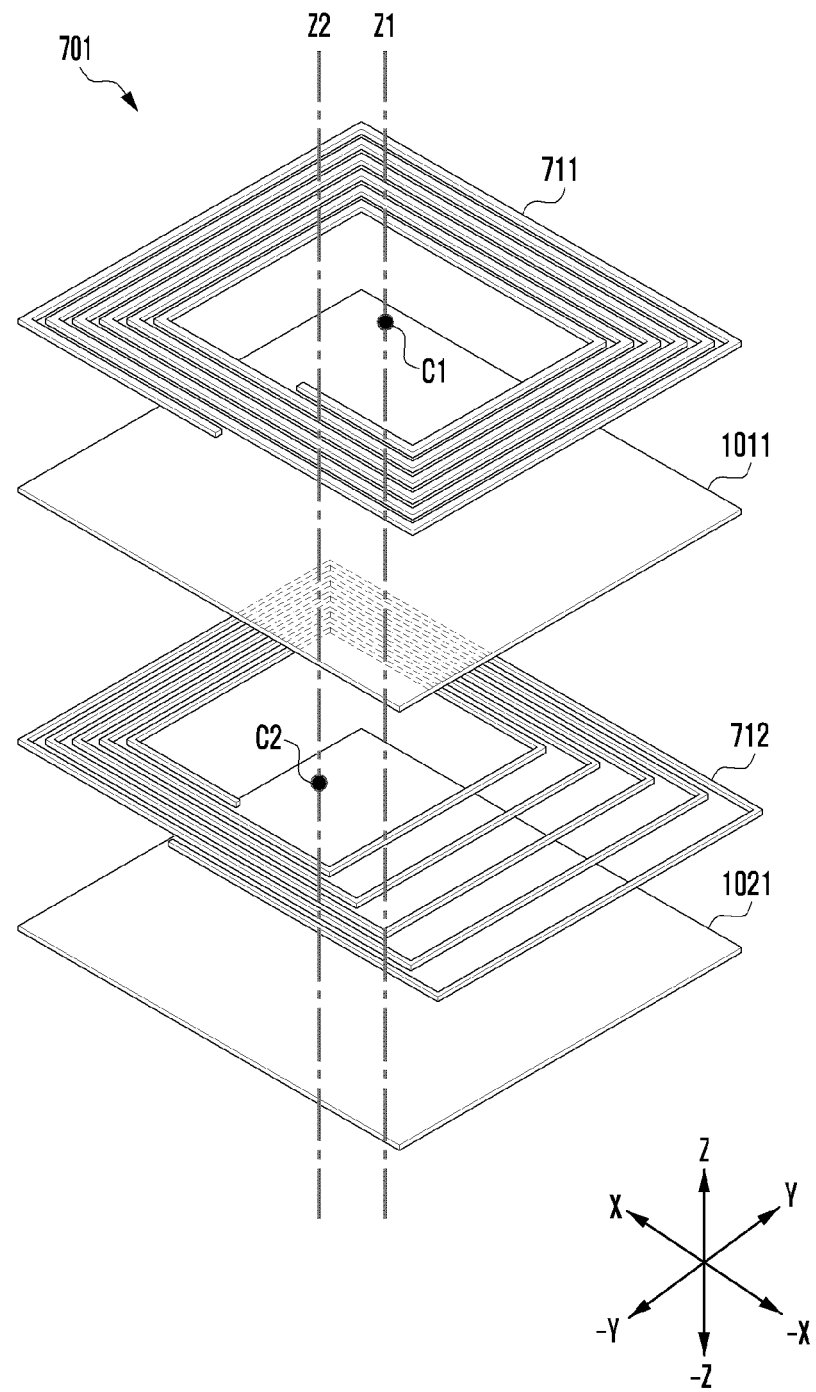
FIG. 10 is a stacked perspective view illustrating some layers of a circuit board including coils according to various embodiments of the disclosure.

FIG. 10 is a stacked perspective view illustrating some layers of a circuit board including coils according to various embodiments of the disclosure.

The coil shown in FIG. 10 may be at least partially similar to the coil in FIGS. 7 to 9B, or may include other embodiments thereof. Hereinafter, a description will be made based on the features of the coil that have not been described in FIGS. 7 to 9B or that differ from those therein with reference to FIG. 10.

Referring to FIG. 10, the circuit board 701 may include a first coil 711 and a second coil 712 in a loop shape as antennas for short-distance communication. For example, the circuit board 701 may include a flexible printed circuit board (FPCB).

According to an embodiment, the first coil 711 and the second coil 712 may be formed on different layers of the circuit board 701.

According to an embodiment, the circuit board 701 may include an insulation layer 1011 formed between the first coil 711 and the second coil 712. According to an embodiment, the insulation layer 1011 may include a polyimide (PI) film.

According to an embodiment, the first coil 711 may be disposed in a third direction (the direction of the Z axis) from the insulation layer 1011. According to an embodiment, as described with reference to FIG. 9A, the first coil 711 may form an antenna radiator in a loop shape, which is wound a specified number of times around the center C1 of the first coil 711 to have a specific gap therebetween (e.g., to have symmetrical gaps between C1 and opposing sides of each winding of the first coil 711).

According to an embodiment, the second coil 712 may be disposed in a fourth direction (the direction of the −Z axis) from the insulation layer 1011. For example, the fourth direction (the direction of the −Z axis) may be opposite to the third direction (the direction of the Z axis). According to an embodiment, as described with reference to FIG. 9B, the second coil 712 may form an antenna radiator in a loop shape, which is wound a specified number of times around the center C2 of the second coil 712 to have asymmetrical gaps therebetween based on the same (e.g., to have asymmetrical gaps between C2 and opposing sides of each winding of the second coil 712).

According to an embodiment, the circuit board 701 may include a shielding layer 1021 formed in the fourth direction (the direction of the −Z axis) from the second coil 712. According to an embodiment, the shielding layer 1021 may include a shielding member, and play the role of a core for increasing the magnetic force generated by the first coil 711 and/or the second coil 712. According to an embodiment, the shielding member may include a metal.

According to an embodiment, the circuit board 701 may further include an insulation layer (e.g., similar to the insulation layer 1011) between the second coil 712 and the shielding layer 1021. As another example, an insulation layer (e.g., similar to the insulation layer 1011) may be further included in the third direction from the first coil 711. As another example, an insulation layer (e.g., similar to the insulation layer 1011) may be further included in the fourth direction from the shielding layer 1021.

According to an embodiment, a second Z-axis Z2 passing through the center C2 of the second coil 712 may be offset in the first direction (the direction of the X axis) from a first Z-axis Z1 passing through the center C1 of the first coil 711 in the circuit board 701. For example, the first direction may be the direction in which the first housing 310 of the electronic device 300 slides out relative to the second housing 320.

Figure 11:
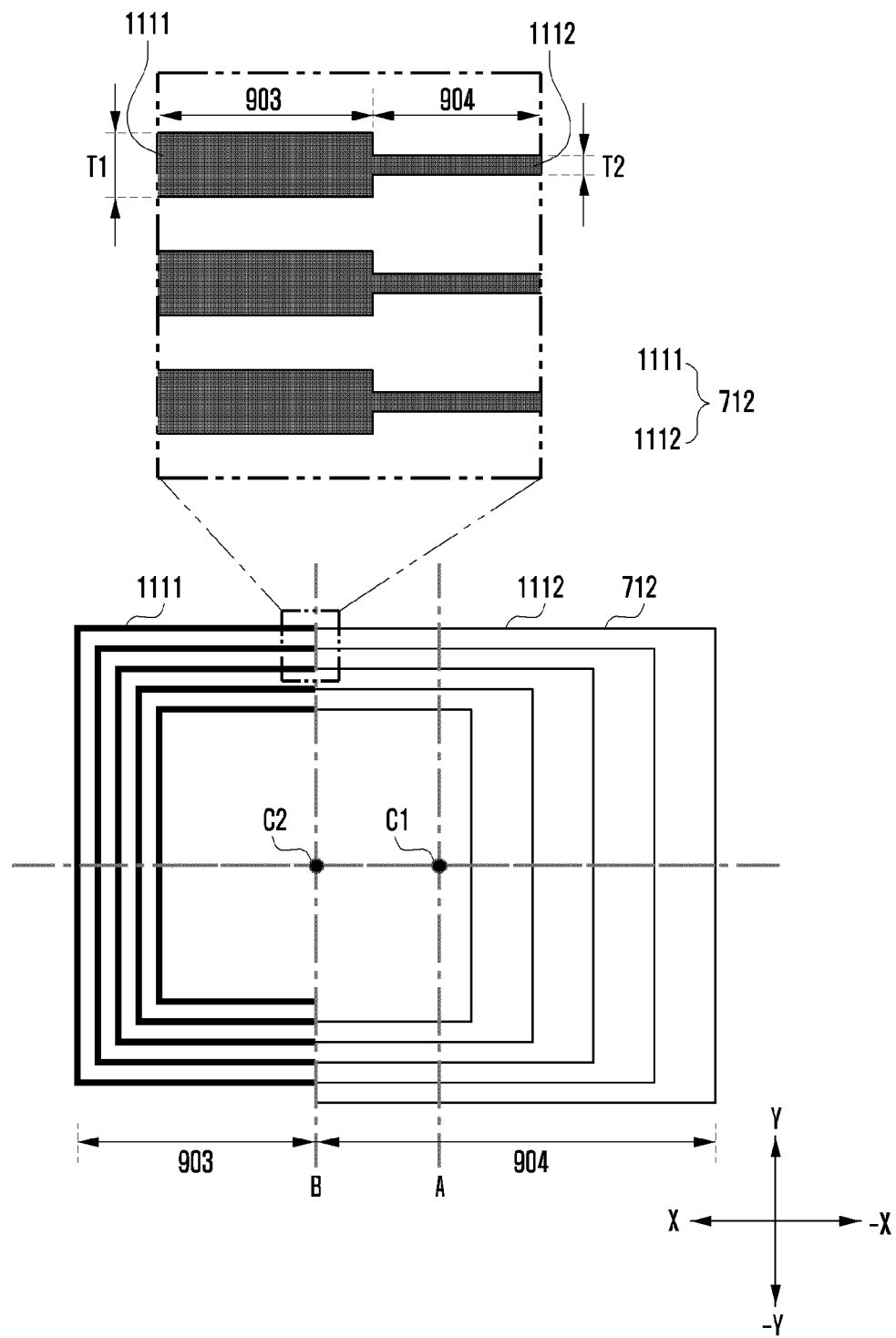
FIG. 11 is a plan view illustrating a form of a second coil according to another embodiment.

FIG. 11 is a plan view illustrating a form of a second coil 712 according to another embodiment.

The second coil 712 shown in FIG. 11 may be at least partially similar to the second coil 712 in FIGS. 8, 9B, and 10, or may include other embodiments thereof. Hereinafter, a description will be made based on the features of the second coil 712 that have not been described in FIGS. 8, 9B, and 10 or that differ from those therein with reference to FIG. 11.

Referring to FIG. 11, the line width (or thickness) of the second coil 712 according to an embodiment may not be constant, unlike the embodiment illustrated in FIG. 9B.

According to an embodiment, the center C2 of the second coil 712 may be disposed on the second central axis (the axis B) of the electronic device 300 crossing the center of the electronic device 300 in the open state. According to an embodiment, the second coil 712 may be separated into a third area 903 and a fourth area 904, based on the second central axis (the axis B) of the electronic device 300.

According to an embodiment, the third area 903 of the second coil 712 may be an area disposed in the first direction (the direction of the X axis) from the second central axis (the axis B) of the electronic device 300, and include third portions 1111 of the second coil 712.

According to an embodiment, the fourth area 904 of the second coil 712 may be an area disposed in the second direction (the direction of the −X axis) from the second central axis (the axis B) of the electronic device 300, and include fourth portions 1112 of the second coil 712.

According to an embodiment, the third portions 1111 of the second coil 712 may be formed to have a first line width T1 (or a first thickness).

According to an embodiment, the fourth portions 1112 of the second coil 712 may be formed to have a second line width T2 (or a second thickness). According to an embodiment, the second line width T2 may be smaller than the first line width T1.

According to an embodiment, since the first line width T1 of the third portions 1111 are formed to be greater than the second line width T2 of the fourth portions 1112 in the second coil 712, the magnetic field generated by the second coil 712 may be stronger in the third portions 1111 than in other portions. For example, in the second coil 712, the magnetic field formed by the third portions 1111 may be stronger than the magnetic field formed by the fourth portions 1112.

Figure 12:
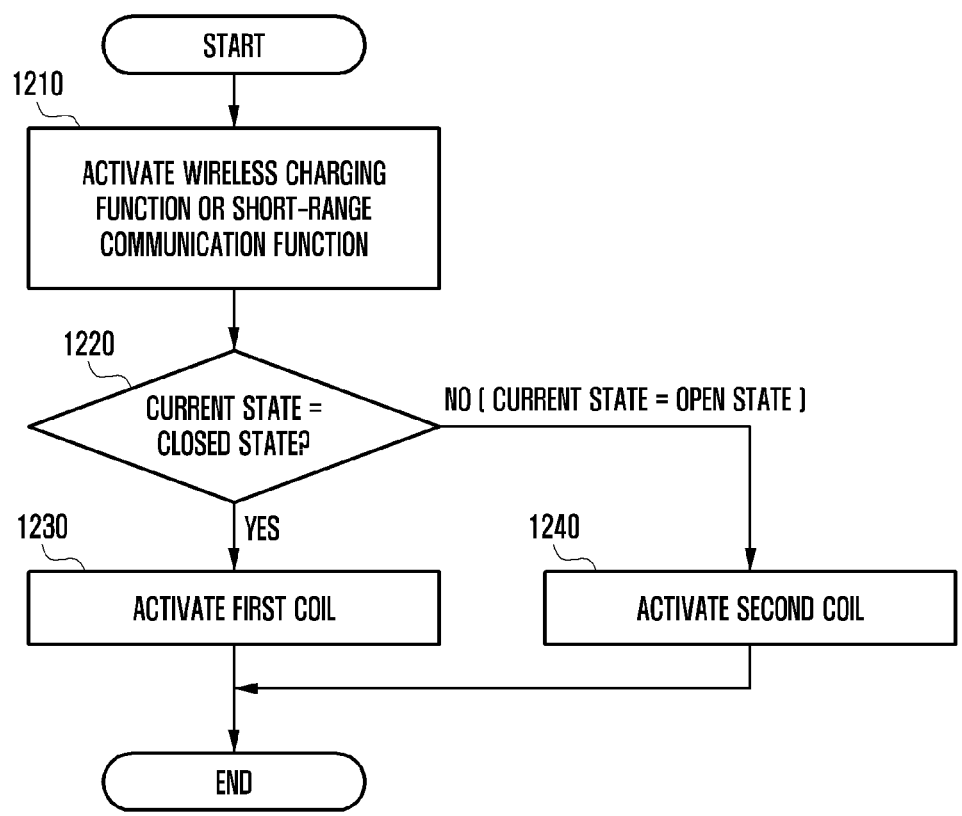
FIG. 12 is a flowchart illustrating the operation of an electronic device according to various embodiments of the disclosure.

FIG. 12 is a flowchart illustrating the operation of an electronic device 300 according to various embodiments of the disclosure.

According to various embodiments, the operations illustrated in FIG. 12 may be performed by a processor (e.g., the processor 120 in FIG. 1) of an electronic device 300 (e.g., the electronic device 101 in FIG. 1). According to various embodiments, the electronic device 300 may include a memory (e.g., the memory 130 in FIG. 1), and the memory 130 may store instructions that, when executed, cause the processor 120 to perform at least some of the operations illustrated in FIG. 12.

In operation 1210, the electronic device 300 may activate a wireless charging function or short-range communication functions. According to an embodiment, the processor (e.g., the processor 120 in FIG. 1) of the electronic device 300 may activate (or execute) short-range communication functions (e.g., a wireless charging function, an MST communication function, or an NFC communication function), based on a specified event. According to an embodiment, the event for executing the short-range communication functions may be one of various user inputs to the electronic device 300, which may include, for example, a touch input on a display (e.g., the display module 160 in FIG. 1), a voice input, or an input of pressing a physical button exposed to the outside of the electronic device 300. In an embodiment, when a wireless charging device (e.g., the wireless charging pad 1300 in FIG. 13) is located within a specified distance of the electronic device 101, the wireless charging function of the electronic device 101 may be activated.

In operation 1220, the electronic device 300 may identify whether or not the current state is a closed state. For example, the electronic device 300 may detect whether the current state is a closed state while a wireless charging function or a short-range communication function is activated.

According to an embodiment, if the current state is a closed state (e.g., the result of operation 1220 is "Yes"), the electronic device 300 may perform operation 1230.

According to an embodiment, if the current state is not the closed state (e.g., the result of operation 1220 is "No"), the electronic device 300 may perform operation 1240. For example, if the current state is an open state (e.g., the result of operation 1220 is "No"), the electronic device 300 may perform operation 1240.

In operation 1230, the electronic device 300 may activate a first coil (e.g., the first coil 711 in FIG. 9A) to perform a wireless charging function or a short-range communication function.

According to an embodiment, the operation of activating the first coil 711 may be defined as an operation of electrically (or operably) connecting the first coil 711 with a wireless communication module (e.g., the wireless communication module 192 in FIG. 2) or a wireless charging module (e.g., the wireless charging module 250 in FIG. 2).

In operation 1240, the electronic device 300 may activate a second coil (e.g., the second coil 712 in FIG. 9B) to perform a wireless charging function or a short-range communication function.

According to an embodiment, the operation of activating the second coil 712 may be defined as an operation of electrically (or operably) connecting the second coil 712 with a wireless communication module (e.g., the wireless communication module 192 in FIG. 2) or a wireless charging module (e.g., the wireless charging module 250 in FIG. 2).

According to an embodiment, the electronic device 300 may selectively connect a short-range communication module (e.g., the wireless communication module 192 in FIG. 2 or the wireless charging module 250 in FIG. 2) to the first coil or the second coil.

Figure 13:
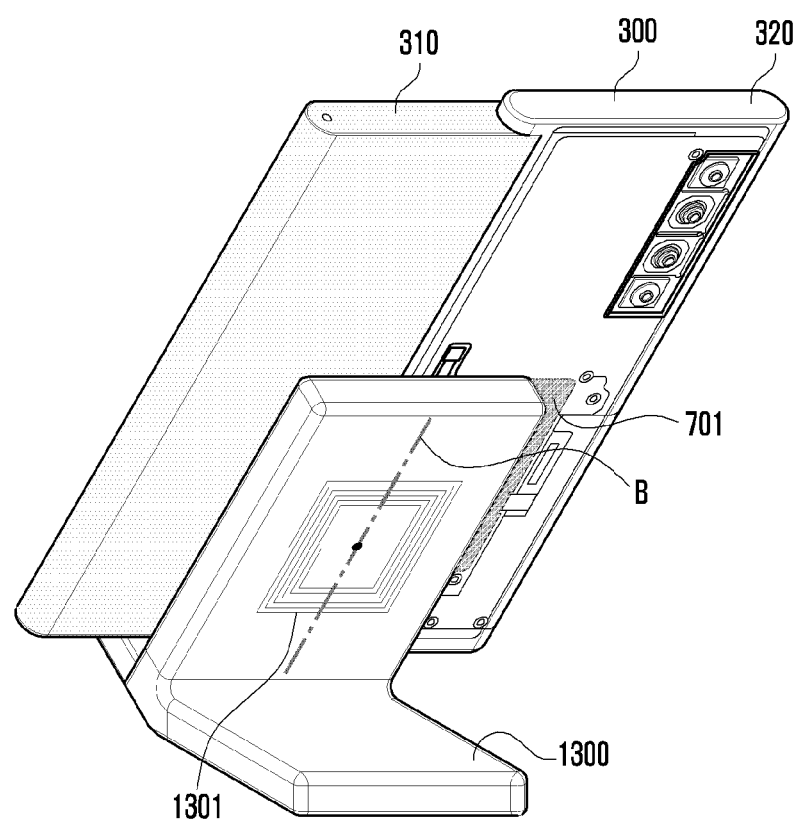
FIG. 13 is an example illustrating a scenario in which an electronic device wirelessly receives power according to various embodiments of the disclosure.

FIG. 13 is an example illustrating a scenario in which an electronic device 300 is mounted on (or placed on) a wireless charging pad 1300 to wirelessly receive power according to various embodiments of the disclosure.

Referring to FIG. 13, an electronic device 300 (e.g., the electronic device 101 in FIG. 1) according to various embodiments may be mounted on a wireless charging pad 1300 to wirelessly receive power. The wireless charging pad 1300 may include an external coil 1301 for wirelessly transmitting power, and the electronic device 300 may wirelessly receive power through a coil (e.g., the second coil 712 in FIG. 9B) that resonates with the external coil 1301.

According to an embodiment, when the electronic device 300 is in an open state, as shown in the illustrated example, the electronic device 300 may activate the second coil 712 and wirelessly receive power through the activated second coil 712. According to an embodiment, the center C2 of the second coil 712 is disposed on the central axis (e.g., the axis B in FIG. 9B) of the electronic device 300 in the open state, so the efficiency of the wireless charging function can be improved compared to the state in which the first coil 711 is activated. The efficiency of the wireless charging function may be defined as a rate at which the battery of the electronic device 300 is charged using the wireless charging function. For example, the wireless charging pad 1300 may be manufactured to have a size that is based on the width of the electronic device 300 in the closed state. Accordingly, when the electronic device 300 is in the open state, if the center C1 of the first coil 711 is aligned with the external coil 1301, the electronic device 300 may not be fixed to the wireless charging pad 1300, and if the electronic device 300 is fixedly positioned on the wireless charging pad, the center C1 of the first coil 711 may not be aligned with the external coil 1301, thereby lowering the efficiency of the wireless charging function. In this case, if the second coil 712 is used, the center C2 of the second coil 712 may be better aligned with the external coil 1301 than the center C1 of the first coil 711, so that reduction in the efficiency of the wireless charging function is reduced.

Figure 14:
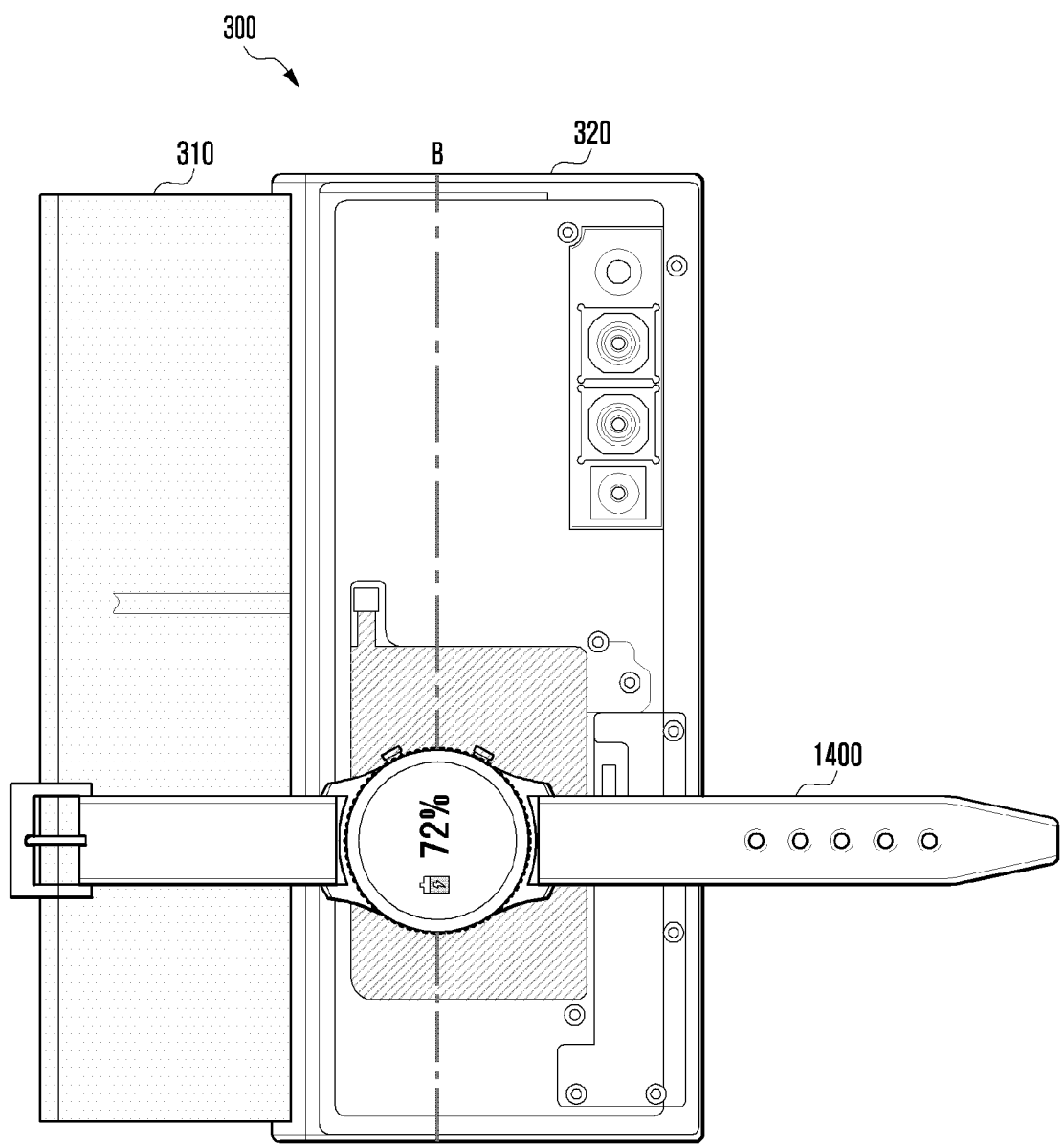
FIG. 14 is an example illustrating a scenario in which an electronic device wirelessly transmits power to an external device according to various embodiments of the disclosure.

FIG. 14 is an example illustrating a scenario in which an electronic device 300 wirelessly transmits power to an external device according to various embodiments of the disclosure.

Referring to FIG. 14, an electronic device 300 (e.g., the electronic device 101 in FIG. 1) according to various embodiments may wirelessly transmit power when an external device 1400 is mounted on (or placed on) the electronic device 300. For example, the external device 1400 may be an electronic watch supporting a wireless charging function.

According to an embodiment, when the electronic device 300 is in the open state as shown in the illustrated example, the electronic device 300 may activate a second coil 712 (e.g., the second coil 712 in FIG. 9B), and wirelessly transmit power through the activated second coil 712. According to an embodiment, the center C2 of the second coil 712 is formed to be positioned on the central axis (axis B) (e.g., the axis B in FIG. 9B) of the electronic device 300 in the open state, so the efficiency of the wireless charging function may be improved compared to the case of wirelessly transmitting power using the first coil 711. The efficiency of the wireless charging function may be defined as a rate at which the battery of the external device 1400 is charged using the wireless charging function.

According to an embodiment, the electronic device 300 may activate whichever of the first coil 711 or the second coil 712 has its center (C1 or C2, respectively) closer to the center of the external coil included in the external device 1400.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing comprising a first housing and a second housing and configured such that the first housing is able to slide in a first direction with respect to the second housing;
   a short-range communication module located inside the housing;
   a circuit board located inside the housing, the circuit board comprising a first coil and a second coil that are configured to be selectively connected to the short-range communication module; and
   a processor located inside the housing,
   wherein the processor is configured to:
   activate a short-range communication function using the short-range communication module,
   perform the short-range communication function using the first coil in a closed state in which at least a first portion of the first housing is slid into an inner space of the second housing, and
   perform the short-range communication function using the second coil in an open state in which at least a second portion of the first housing is slid out of the inner space of the second housing,
   wherein a center of the first coil is disposed to be aligned with a first central axis that crosses a center of the electronic device in the closed state, and
   wherein a center of the second coil is disposed to be aligned with a second central axis that crosses the center of the electronic device in the open state.

2. The electronic device of claim 1, wherein the first central axis crosses the center of the first coil, and
   wherein the second central axis crosses the center of the second coil.

3. The electronic device of claim 1, wherein the center of the first coil is disposed within a specified distance from the first central axis, and
   wherein the center of the second coil is disposed within a specified distance from the second central axis and is offset in the first direction from the center of the first coil.

4. The electronic device of claim 1, wherein the first coil forms a loop-shaped antenna that is wound a specified number of times in a specified direction around the center of the first coil, and
   wherein portions of the first coil that are adjacent to each other in the loop-shaped antenna have a same gap therebetween.

5. The electronic device of claim 4, wherein the first coil comprises first portions disposed in the first direction with respect to the center of the first coil, and second portions disposed in a second direction opposite the first direction with respect to the center of the first coil, and
   wherein a first gap between first portions that are adjacent to each other is the same as a second gap between second portions that are adjacent to each other.

6. The electronic device of claim 1, wherein the second coil forms a loop-shaped antenna wound a specified number of times in a specified direction around the center of the second coil, and
   wherein a gap between portions of the second coil that are adjacent to each other increases in the first direction.

7. The electronic device of claim 6, wherein the second coil comprises third portions disposed in the first direction with respect to the center of the second coil and fourth portions disposed in a second direction opposite the first direction with respect to the center of the second coil, and
   wherein a fourth gap between fourth portions that are adjacent to each other is greater than a third gap between third portions that are adjacent to each other.

8. The electronic device of claim 7, wherein the gap between the fourth portions that are adjacent to each other increases with distance from the center of the second coil in the first direction.

9. The electronic device of claim 7, wherein the third portions are formed to have a first line width, and
   wherein the fourth portions are formed to have a second line width smaller than the first line width.

10. The electronic device of claim 1, wherein the short-range communication module comprises at least one of a magnetic secure transmission (MST) communication module, a near field communication (NFC) communication module, or a wireless charging module.

11. The electronic device of claim 1, wherein the first coil and the second coil are formed on different layers of the circuit board from each other.

12. The electronic device of claim 1, wherein the processor is configured to activate the first coil and deactivate the second coil, based on switching of the electronic device from the open state to the closed state.

13. The electronic device of claim 1, wherein the processor is configured to activate the second coil and deactivate the first coil, based on switching of the electronic device from the closed state to the open state.

14. A method of an electronic device, the method comprising:
   performing a short-range communication function using a first coil in a closed state in which at least a first portion of a first housing of the electronic device is slid into an inner space of a second housing of the electronic device; and
   performing the short-range communication function using a second coil in an open state in which at least a second portion of the first housing is slid out of the inner space of the second housing.

15. The method of claim 14, further comprising activating the first coil and deactivating the second coil, based on switching of the electronic device from the open state to the closed state.

* * * * *